US009259634B1

(12) United States Patent
Bouse

(10) Patent No.: US 9,259,634 B1
(45) Date of Patent: Feb. 16, 2016

(54) METHOD AND SYSTEM FOR CREATING AND CONTROLLING A VEHICULAR ROBOT ATHLETE

(71) Applicant: Earl L. Bouse, Dahlonega, GA (US)

(72) Inventor: Earl L. Bouse, Dahlonega, GA (US)

(*) Notice: Subject to any disclaimer, the term of this patent is extended or adjusted under 35 U.S.C. 154(b) by 317 days.

(21) Appl. No.: 13/647,351

(22) Filed: Oct. 8, 2012

(51) Int. Cl.
*A63B 69/00* (2006.01)
*A63B 69/34* (2006.01)

(52) U.S. Cl.
CPC ..................................... *A63B 69/34* (2013.01)

(58) Field of Classification Search
None
See application file for complete search history.

(56) References Cited

U.S. PATENT DOCUMENTS

| | | | | |
|---|---|---|---|---|
| 3,379,441 A | * | 4/1968 | Feather et al. | 473/570 |
| 3,573,867 A | * | 4/1971 | Mehrens | 473/439 |
| 3,692,309 A | * | 9/1972 | Mehrens | 473/439 |
| 6,198,247 B1 | * | 3/2001 | Barr | 318/568.1 |
| 2009/0098955 A1 | * | 4/2009 | Crook, II | 473/422 |
| 2012/0208660 A1 | * | 8/2012 | Mayers | 473/447 |
| 2013/0211594 A1 | * | 8/2013 | Stephens, Jr. | B25J 9/1689 700/259 |

* cited by examiner

*Primary Examiner* — Tramar Harper
(74) *Attorney, Agent, or Firm* — Smith Risley Tempel Santos LLC

(57) ABSTRACT

Devices, systems, and methods for training players of team sports are presented. A robot athlete emulates a sports player and includes a motive system for moving about a sports field. The robot athlete also includes an anthropomorphic figure with mechanisms for rotating the torso, raising the arms, and a lifting the torso to emulate a stretch or jump. An inventive method and system for controlling the robot athlete may include resetting the body of the robot athlete to a neutral position and determining if one of a plurality of modes of operation has been selected. Exemplary modes of operation may include an automatic mode, a pursuit mode, and a remote control mode. In the automatic mode, the robot athlete may monitor an array of sensors with a control system that responds to human player movement with one or more sets of predefined motion routines.

6 Claims, 19 Drawing Sheets

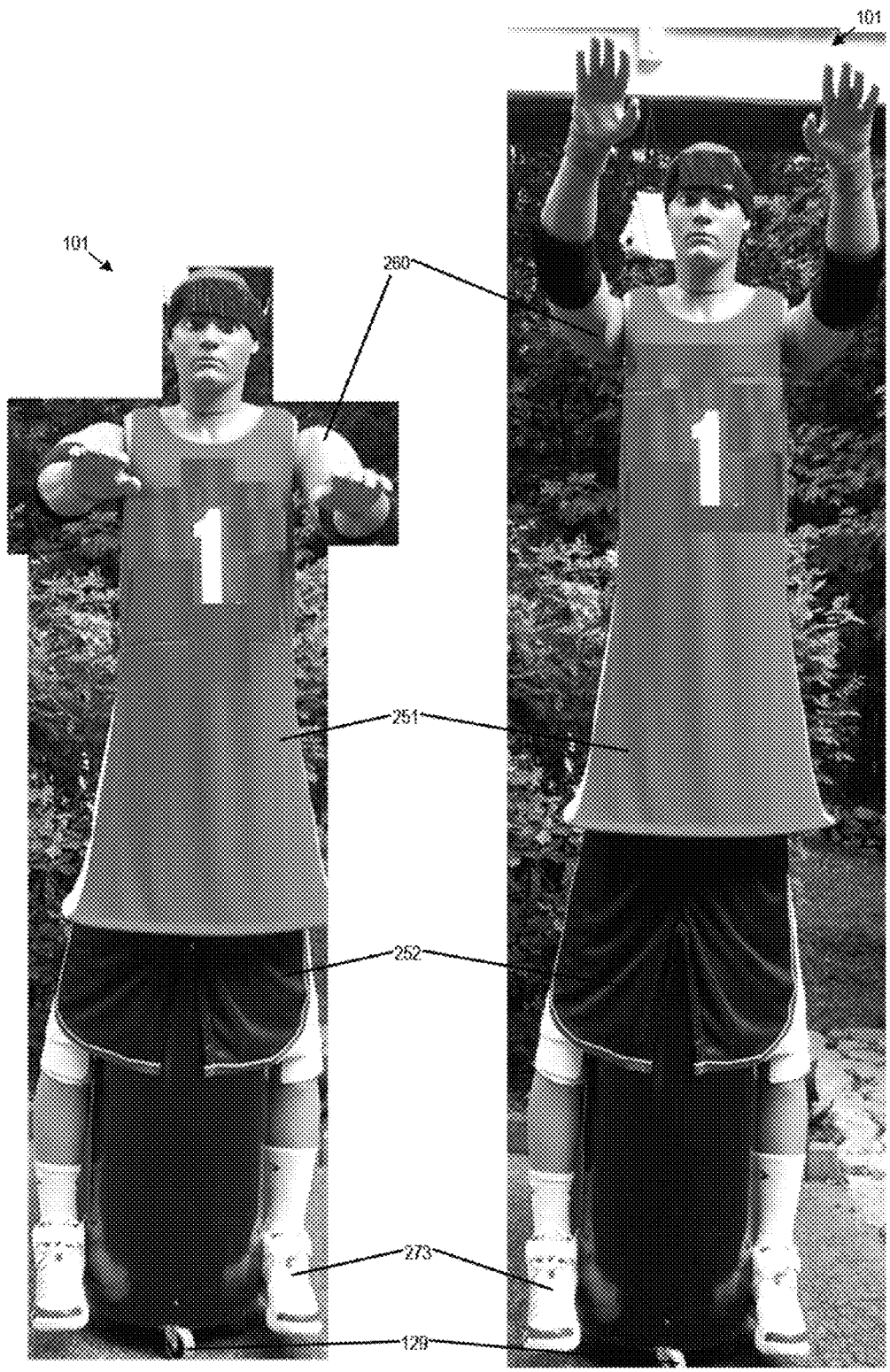
FIG. 1E      FIG. 1F

FIG. 9A  FIG. 9B

METHOD AND SYSTEM FOR CREATING AND CONTROLLING A VEHICULAR ROBOT ATHLETE

BACKGROUND

The following disclosure relates generally to sports training equipment and, more particularly, to vehicular robotic systems for training players of team sports such as basketball.

Basic skills training for team sports players, especially beginners, often involves personal, one-on-one attention and direction. Players learn and develop important offensive skills when they can play against one or more defensive players. Offensive skills are further developed through practice and repetition, preferably in an environment that is most like the situations encountered in a competitive contest.

The task of providing player training and practice using repetitive drills in game-like situations requires participation by a coach, a trainer, a teammate, or another person with knowledge of the fundamental skills of the game. Devoting such a person to the task of running drills is a continuing challenge because most teams have limited able-bodied personnel and tight practice schedules. For example, coaches and trainers have the skills, but running repetitive drills is not the best use of their coaching talent or their limited time with the entire team. Hence the need for a specialized training dummy in the context of organized practices.

Also, most team sports players benefit from practicing basic skills, such as the jump shot in basketball, and doing so over and over again, on their own time, outside of team practices. The benefits of traditional solo training are limited, especially in team sports where practicing against another player is best and no one else is present to control or manipulate a training dummy. Hence the need for a specialized training dummy in the context of solo practice.

Existing training dummies used in most sports create a low-quality practice environment and produce limited benefit to the player. Stationary dummies simply cannot simulate the actions of a live defensive player; and, as a result, they cannot create the physical—and the arguably even more important psychological—impact on the offensive player of being confronted by a hostile and powerful defender in a game situation. Even a portable dummy with some movable parts—like PROFENDER™, see www.theoriginalprofender.com—typically requires a skilled and able-bodied person to move the dummy into various positions and to manipulate its height. Traditional training dummies are unsatisfactory for team practice or for solo drills.

What is needed is a method and system which addresses these numerous and often complex training issues faced by players and coaches.

BRIEF SUMMARY

A vehicular robot athlete solves these complex problems faced by players learning or perfecting a sport and by their coaches. A vehicular robot athlete may include a vehicle subsystem for propelling the robot athlete; and an anthropomorphic torso with a head and arms like a human coupled to the vehicle subsystem, which torso can be quickly and seamlessly adjusted to a plurality of heights to simulate jumping, and where the arms move in unison and may be quickly and seamlessly adjusted into a plurality of positions for simulating the blocking action of an athlete. The robot athlete may further include a chassis which is part of the vehicle subsystem and is supported by a plurality of wheels. The robot athlete may further have a power system supported by the chassis and which provides energy to power to various motors that are part of the vehicle subsystem, so as to propel the robot athlete forward, backwards, and sideways to simulate further the actions of a player in a sport.

An inventive method and system for controlling a robot athlete may include resetting a body of the robot athlete to a neutral position and determining if one of a plurality of modes of operation has been selected.

If a remote control mode of operation has been selected, then a wireless receiver may be monitored for commands received from a wireless transmission.

For instance, properly run with an easy to use joy-stick-type remote control in a basketball modality, the robot athlete can be made repetitively to run up to players, such as basketball shooters, confront them, quickly and indefatigably leap up to about 10 feet or more in the air, while twisting its body and waiving its arms in an effort to block their shot, so as to force the offensive players to develop and perfect their jump shots under pressure, while periodically and deliberately fouling them to further "toughen them up"—all the while "trash talking" through the hidden speaker in the robot athlete's torso.

The robot athlete may be referred to as a "sixth man" relative to the sport of basketball, since a basketball team may have some injured or disabled athlete or a team manager or booster, who is a "professional" at (has skills in) electronic gaming and who would eagerly welcome the opportunity to have the robot athlete as his or hers on-the-court avatar, in order to become a contributing and valued member of the team—freeing up the coach to coach and the able-bodied team members to practice. The "sixth man" operated by a member of the basketball team may also wear a remote microphone headset that would enable him or her to "trash talk" through the hidden speaker in the torso/chest of the robot athlete—or, alternatively, the remote microphone headset could be worn by the coach for barking commands or encouragement to his players.

If an automatic mode of operation has been selected, then one or more sensors may be monitored to detect movement of one or more objects relative to the robot athlete and moving the robot athlete in preprogrammed response to a detection of movement.

If a so-called pursuit mode of operation has been selected, then one or more sensors may be monitored in order to detect the presence of a movable and variable-length track (such as a strip of polarized reflective tape), which can be repositioned on the court in connection with different drills and which the robot athlete will repetitively follow, up and back, as it pursues a preprogrammed routine of defensive maneuvers against which a live offensive player or several players can practice and perfect their shooting skills. This pursuit mode may be particularly effective when utilized in combination with existing automatic ball-return devices, such as the GUN™ by Shoot-A-Way in a basketball context, see www.shootaway.com.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE SEVERAL VIEWS OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all FIGs.

FIG. 1E illustrates a front view of a robot athlete having arms aligned in a direction of movement for a vehicle subsystem of the robot, like FIG. 1B, but with the torso of the body slightly raised according to one exemplary embodiment.

FIG. 1F illustrates a front view of a robot athlete having arms aligned in a direction of movement for a vehicle subsystem of the robot, like FIG. 1E, but with the torso of the body raised slightly higher and the arms more raised according to one exemplary embodiment.

FIG. 9A is a schematic that illustrates a first position of the game jersey relative to the game shorts when the torso of the robot athlete is extended according to one exemplary embodiment.

FIG. 9B is a schematic that illustrates a second position of the game jersey relative to the game shorts when the torso of the robot athlete is extended according to one exemplary embodiment.

DETAILED DESCRIPTION

Figure 1A:
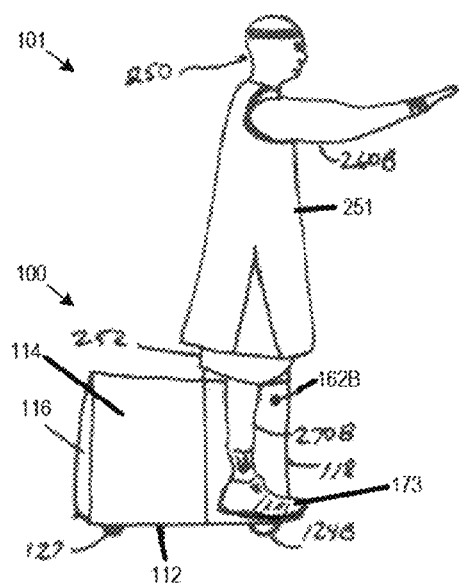
FIG. 1A illustrates a side view of a robot athlete having arms aligned in a direction of movement for a vehicle subsystem of the robot according to one exemplary embodiment.

Aspects, features and advantages of several exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute terms such as, for example, "will," "will not," "shall," "shall not," "must" and "must not" are not meant to limit the scope of the present invention as the embodiments disclosed herein are merely exemplary.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers.

In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet and/or a telecommunications network with other systems by way of the signal).

Vehicle

According to a particular embodiment, a vehicle that is operative to emulate a defensive player includes a chassis, a power system, a motive system, an anthropomorphic figure, and a programmable control system. The figure may include a human-like torso and a pair of arms. The vehicle may include one or more geared mechanical systems and/or servomechanisms for moving the figure. For example, a mechanism may be positioned to lift the torso from a base position to a raised position, emulating a stretch or jump. Another mechanism may rotate the torso about a substantially vertical axis. Another mechanism may be configured to raise and lower the arms.

In one type of use, the vehicle supporting the figure may be placed on a sports field, such as a basketball court, where it can interact with players in a practice environment. The control system may include an autonomous mode with a set of predefined motion routines that use one or more sensors to respond to player movements. The control system may also include a manual mode with a remote control console that has user interface controls for directing the vehicle from a location remote from the field. In one embodiment, the control system includes a programmable logic controller (PLC) with input modules, output modules, and relays dedicated to certain operations.

Chassis

The chassis in particular embodiments is sized and shaped to support an anthropomorphic figure and various operating systems above a sports field, such as a basketball court.

FIG. 1A illustrates a side view of a vehicular robot athlete 101 having arms 260A, 260B aligned in a direction of movement for a vehicle subsystem 100 of the robot athlete 101 according to one exemplary embodiment—with a chassis 112 supported by a plurality of wheels to provide balanced support for the vehicle. The vehicle subsystem 100 includes a chassis 112 supported by a pair of driven wheels 124 (wheel 124B is shown in FIG. 1A) mounted on opposing left and right sides of the chassis 112. Each driven wheel 124 is powered by its own motor (not shown).

The other wheels or supports may include, as shown, a swivel caster 129 near the front of the chassis 112 (See FIG. 1B), and one or more swivel casters 127, 126 near the rear of the chassis 112. The front of the chassis 112 corresponds to the feet 273 of the robot athlete while the rear of the chassis 112 corresponds to the portion of the chassis 112 which does not have the athlete. One of ordinary skill in the art recognizes that other types of wheels or supports are within the scope of this disclosure. Other supports may include, but are not limited to, rigid casters, swivel casters, spherical wheels, runners, skids, or any other support appropriate for the surface on which the robot athlete 101 moves.

The chassis 112 may also include a tow hook and/or a tow handle (not shown) to facilitate easy transport and maneuvering of the vehicle subsystem 100 into a desired location or position. The chassis 112 has opposing front and rear ends, a main deck or platform, and may include one or more protective covers 114 and a rear panel 116. In various embodiments, the chassis 112 has a relatively low ground clearance. The low ground clearance helps keep the vehicle subsystem's center of mass low, which helps support the static and dynamic loads exerted by the anthropomorphic body or robot athlete 101 and helps keep the vehicle subsystem 100 from overturning.

The swivel caster 129 is also positioned to help keep the unit from tipping forward, especially when the robot athlete 101 is being propelled forward at rapid speed by the vehicle subsystem 100 and the torso 250 of the anthropomorphic body is being raised simultaneously and/or the forward movement is quickly stopped. The chassis 112 may support range sensors 162 which will be described in further detail below.

The robot athlete 101 may comprise a body or torso 250 and a pair of leg like bodies 270 that may include apparel such as shoes 273. The torso 250 may further include a game jersey 251 and a pair of game shorts 252 such that the robot athlete 101 may take on the appearance of a typical athlete. In the exemplary embodiment illustrated in FIG. 1A, the robot athlete 101 is dressed as a basketball player. However, other apparel such as different shoes 273, shorts 252, game jerseys 251 may be employed for other sports such as volleyball, etc.

Figure 1B:
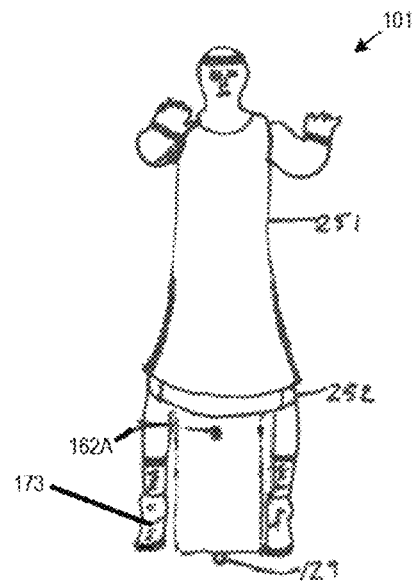
FIG. 1B illustrates a front view of a robot athlete having arms aligned in a direction of movement for a vehicle subsystem of the robot athlete according to one exemplary embodiment.

FIG. 1B illustrates a front view of a robot athlete 101 having arms 260 aligned in a direction of movement for a vehicle subsystem 100 of the robot athlete 101 according to one exemplary embodiment. The direction of movement for the vehicle subsystem 100 is generally reference according to the orientation of the shoes 273 because the robot athlete 101 is designed to look and move like a real human athlete and human athletes typically move in the direction corresponding to the orientation of their feet. In the exemplary embodiment illustrated in FIGS. 1A-1B, the torso 250 of the robot athlete 101 is oriented or aligned with the shoes 273 while the arms 260 are in a slightly elevated or mid-range position.

Figure 1C:
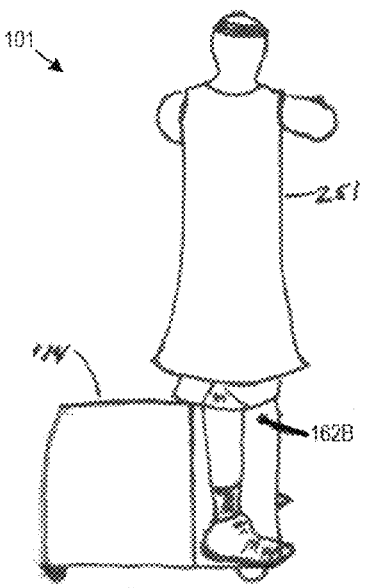
FIG. 1C illustrates a side view of a robot athlete, similar to FIG. 1A, but having arms aligned at an angle relative to a direction of movement for a vehicle subsystem of the robot athlete according to one exemplary embodiment.

FIG. 1C illustrates a side view of a robot athlete 101, similar to FIG. 1A, but having arms 260 aligned at an angle relative to a direction of movement for a vehicle subsystem 100 of the robot athlete 101 according to one exemplary embodiment. According to this exemplary embodiment, the torso 250 has been rotated 90° relative to the shoes 273 of the robot athlete 101. Since the arms 260 are coupled to the torso 250, the arms 260 have been also oriented and an angle of 90° relative to the shoes 273 of the robot athlete 101.

Figure 1D:
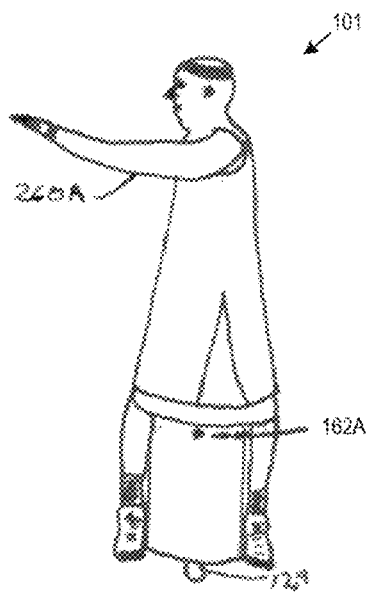
FIG. 1D illustrates a front view of a robot athlete, like FIG. 1B, but having arms aligned at an angle relative to a direction of movement for a vehicle subsystem of the robot athlete according to one exemplary embodiment.

FIG. 1D illustrates a front view of a robot athlete 101, like FIG. 1B, but having arms 260 aligned at an angle relative to a direction of movement for a vehicle subsystem 100 of the robot athlete 101 according to one exemplary embodiment. According to this exemplary embodiment, the torso 250 has been rotated 90° relative to the shoes 273 of the robot athlete 101 and is 180° opposite relative to the orientation illustrated in FIG. 1C. Since the arms 260 are coupled to the torso 250, the arms 260 have been also oriented and an angle of 90° relative to the shoes 273 of the robot athlete 101.

FIG. 1E illustrates a front view of a robot athlete 101 having arms 260 aligned in a direction of movement for a vehicle subsystem 100 of the robot athlete 101, like FIG. 1B, but with the torso 250 of the body slightly raised according to one exemplary embodiment. Relative to FIGS. 1A-D, the torso 250 of the robot athlete 101 has been raised or extended as will be described in further detail below.

FIG. 1F illustrates a front view of a robot athlete 101 having arms 260 aligned in a direction of movement for a vehicle subsystem 100 of the robot athlete 101, like FIG. 1E, but with the torso 250 of the body raised slightly higher and the arms 260 more raised according to one exemplary embodiment. This exemplary embodiment illustrates how the rapid raising or extension of the torso 250 may simulate a player jumping as understood by one of ordinary skill the art. This exemplary embodiment also demonstrates how the game jersey 251 keeps the torso 250 covered at all times even when the torso 250 is extended as will be described in further detail below in connection with FIGS. 9A-9B. This feature helps foster the illusion that the robot athlete 101 is jumping when its torso 250 is rapidly raised.

Figures 1G, 1H:
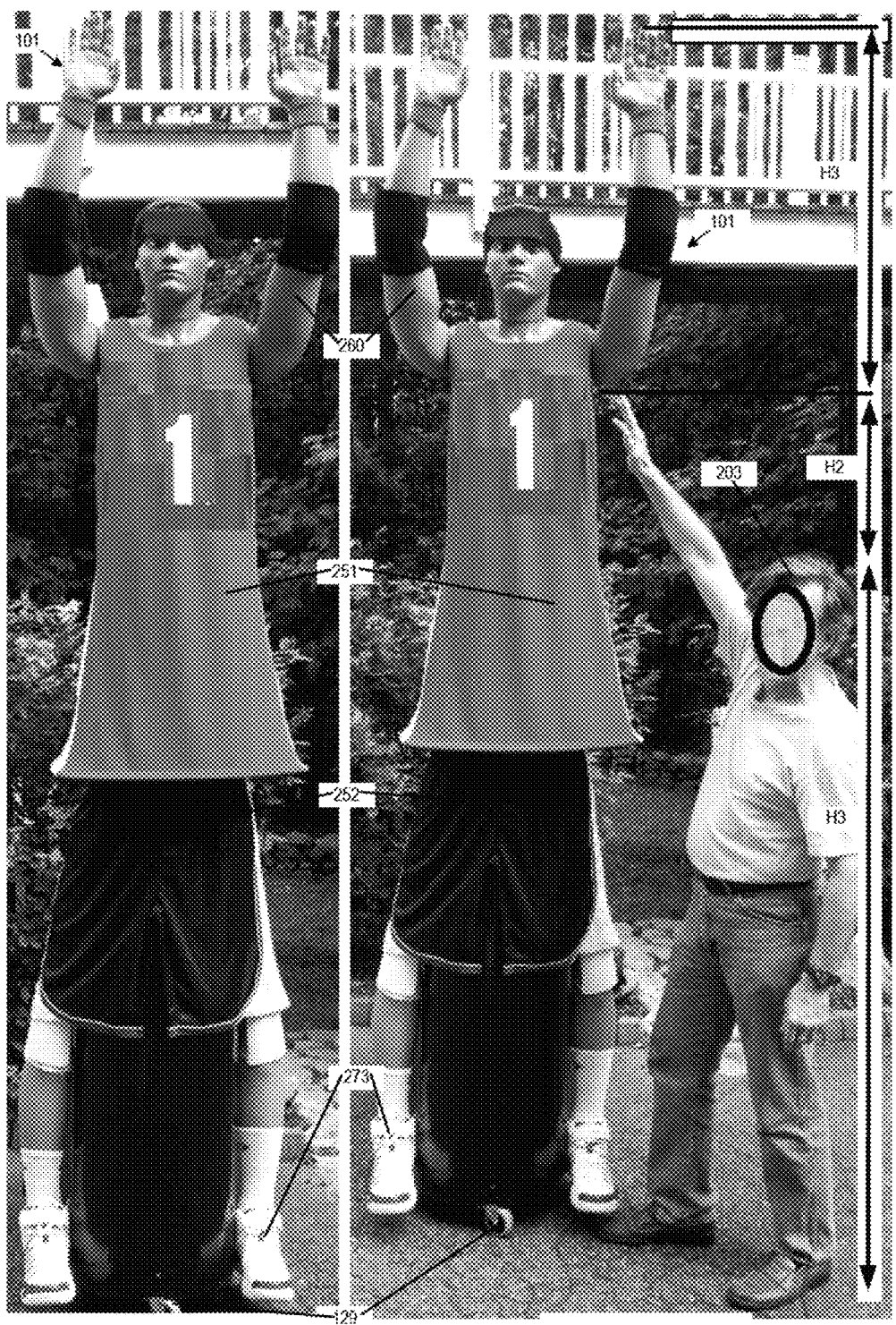
FIG. 1G illustrates a front view of a robot athlete having arms aligned in a direction of movement for a vehicle subsystem of the robot, like FIG. 1F, but with the torso of the body raised even higher and the arms more raised according to one exemplary embodiment.
FIG. 1H illustrates a front view of a robot athlete having arms aligned in a direction of movement for a vehicle subsystem of the robot, like FIG. 1G, but with the torso of the body and the arms in fully extended positions according to one exemplary embodiment.
Figure 1I:
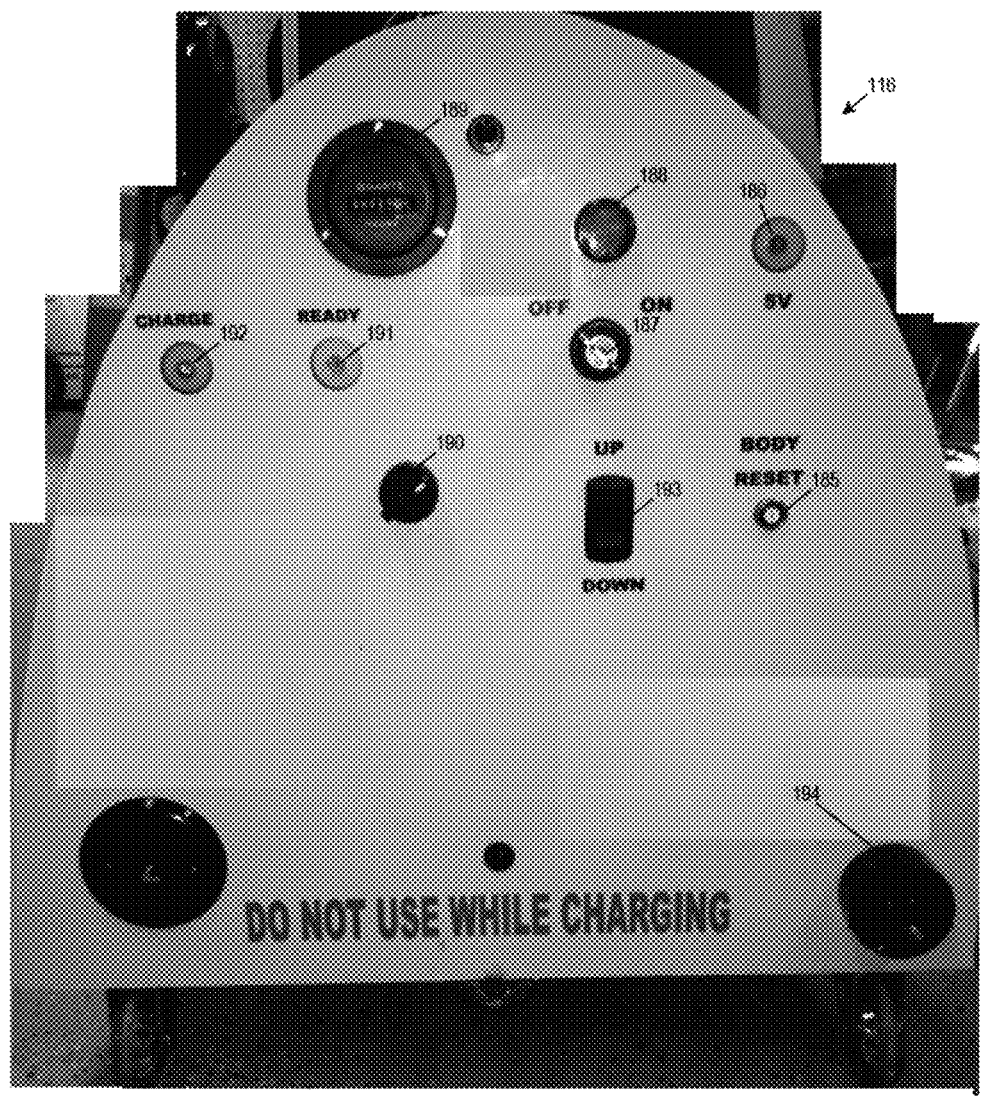
FIG. 1I is a view of the rear panel of the control system that is propelled by the vehicle subsystem according to one exemplary embodiment.

FIG. 1G illustrates a front view of a robot athlete 101 having arms aligned in a direction of movement for a vehicle subsystem 100 of the robot athlete 101, like FIG. 1F, but with the torso 250 of the body raised even higher and the arms 260 more raised according to one exemplary embodiment. In this exemplary embodiment, with the torso 250 and the arms 260 in their fully extended positions, this motion may simulate the leap of a tall player in order to block a shot, such as a shot in basketball and/or volleyball as understood by one of ordinary skill in the art.

FIG. 1H illustrates a front view of a robot athlete 101 having arms 260 aligned in a direction of movement for a vehicle subsystem 100 of the robot athlete 101, like FIG. 1G, but with the torso 250 of the body and the arms 260 in fully extended positions according to one exemplary embodiment. In this exemplary embodiment, a human 203 having an average height H1 of about 6 feet is shown in proximity to the fully extended robot athlete 101.

The fully extended robot athlete 101 may extend past the arm reach H2 which may comprise an additional 2 or 3 feet above the average height H1. The arm reach of the robot athlete 101 may comprise a distance of about 2 feet to about 3 feet above the arm reach height H2 of the human 203 as understood by one of ordinary skill in the art. This means that the reach height H3 which includes the reach height H2 of the human 203 and the height H1 of the human 203 may approach magnitudes of between about 12 to about 15 feet. One of ordinary skill the art recognizes that other magnitudes for the fully extended and contracted positions of the robot athlete are within the scope of this disclosure although not specifically described.

Figure 11:
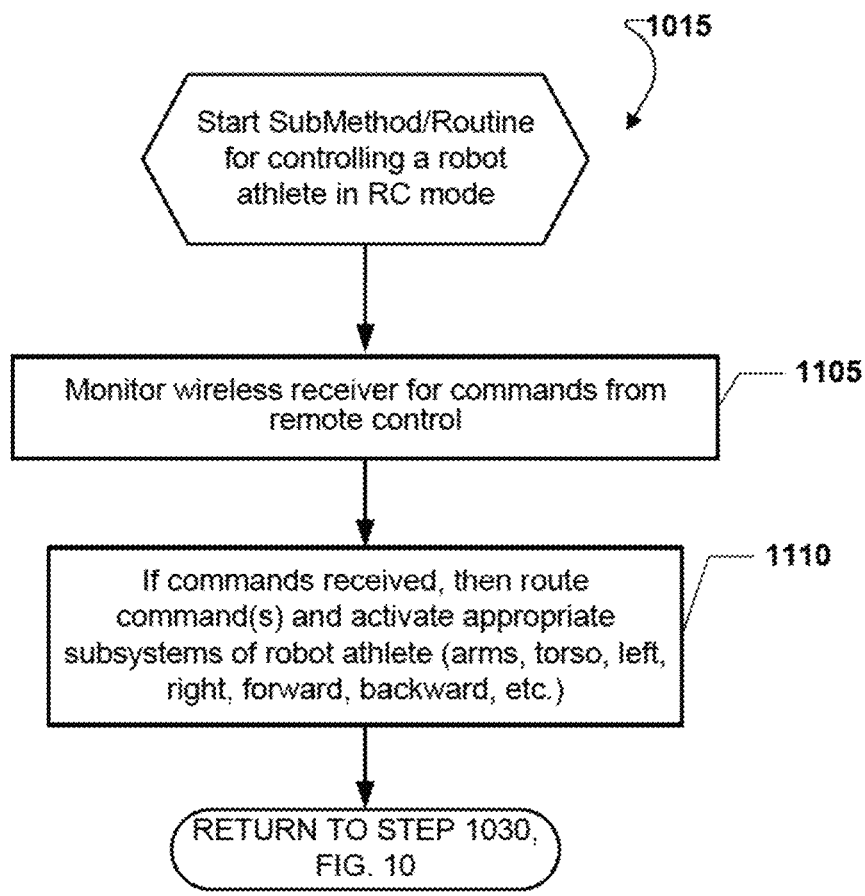
FIG. 11 is a logical flowchart illustrating a submethod/routine of the method of FIG. 10 for controlling a robot athlete in a remote control mode according to one exemplary embodiment.

FIG. 11 is a view of the rear panel 116 of the control system that is propelled by the vehicle subsystem 100 according to one exemplary embodiment. The rear panel 116 may comprise several different types of switches and indicators as will be described herein. The rear panel 116 may comprise a body reset button 185, a voltage light indicator 186, an on/off switch 187, a running light indicator 188, a meter 189 which may track time the robot athlete 101 is operated, a mode switch 190, a ready light 191, and a charge light 192. The body reset button 185 returns the robot athlete 101 to a non-extended, neutral position in which the arms 260 and the torso 250 are placed in non-extended positions.

The meter 189 may track an amount of time that the robot athlete 101 is operated such as in increments of hours. However, other time increments may be selected, such as minutes or days without departing from the scope of this disclosure as understood by one of ordinary skill the art. The mode switch 190 may comprise a multifunction switch in which one of several modes may be selected. For example, the mode switch 190 may allow an operator to select from at least the following modes of operation: an automatic mode, a pursuit mode, and a remote control mode. These three different modes will be described in further detail below in connection with FIGS. 10-13. One of ordinary skill in the art will recognize that fewer or additional modes of operation may be provided in selectable with the mode switch 190 without departing from the scope of this disclosure.

According to some exemplary embodiments, the robot athlete 101 may be manufactured and sold with a reduced number of modes at a first price while another robot athlete 101 may be manufactured and sold with a higher number of modes at a second price. The second price will generally be greater than the first price because of the additional modes of operation being provided compared to the robot athlete sold 101 with the reduced number of modes at the first price.

The rear panel 116 may also support an extension cord and a charging inlet or outlet 194. With the charging inlet or outlet 194, the robot athlete 101 may be charged with alternating electrical current. However, direct current charging may be possible/feasible depending upon the power supplies available for the robot athlete 101.

Figure 1J:
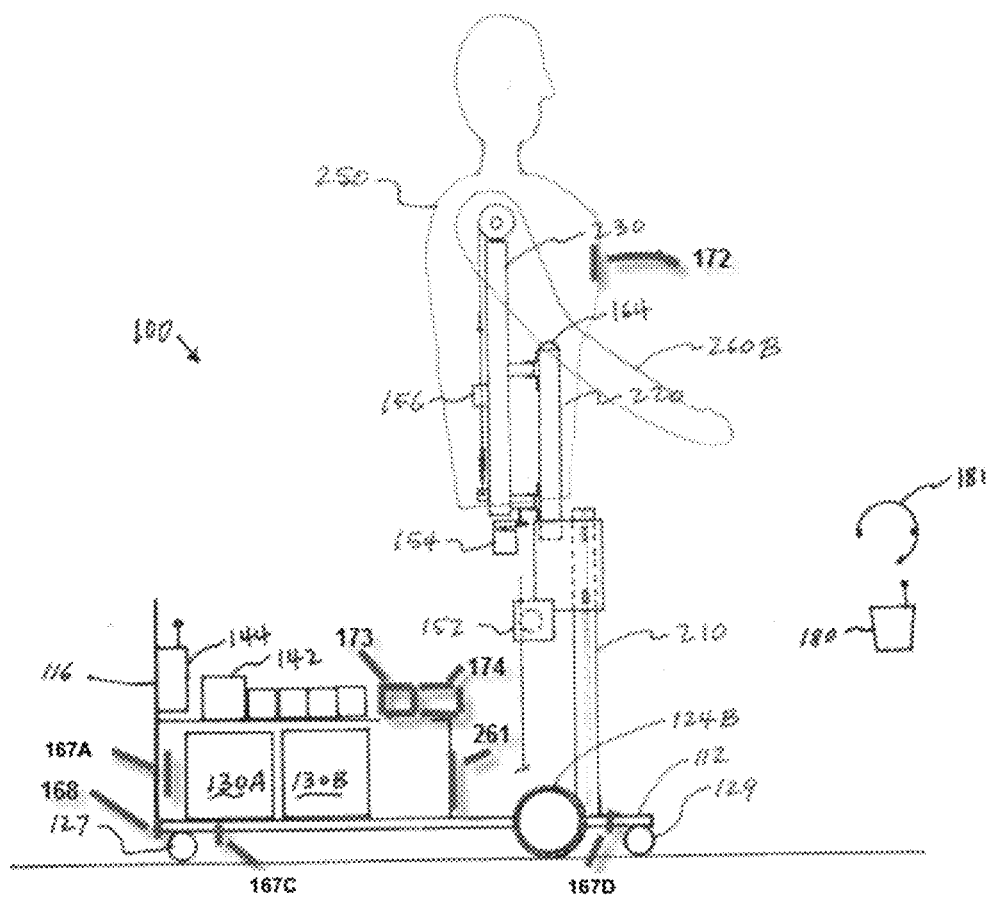
FIG. 1J is an illustration of a plan view of the chassis and various system elements on the vehicle subsystem of the robot athlete according to one exemplary embodiment.

FIG. 1J is an illustration of a plan view of the chassis 112 and various system elements on the vehicle subsystem 100 of the robot athlete 101 according to one exemplary embodiment. The chassis 112 in particular embodiments is sized and shaped to support an anthropomorphic body having a torso 250 and various operating subsystems within a sports field, such as a basketball court or volleyball court.

The chassis 112 is supported by a plurality of wheels to provide balanced support for the vehicle subsystem 100. The wheels may include a pair of driven wheels 124 and one or more other supports such as casters 126, 127.

Anthropomorphic Figure

The vehicle subsystem 100 in particular embodiments is configured to carry a human-like figure having a head and torso-like body 250 that is operative to emulate the movements of a defensive player in a game, such as basketball or volleyball. In one exemplary embodiment, the anthropomorphic body 250 may include a pair of leg-like bodies 270A, 270B (See FIG. 1) with shoes 273 attached to a column wrap 118 (See FIGS. 1 and 5) that is mounted to the chassis 112 of the vehicle subsystem 100.

The torso-like body 250 may have a pair of arm-like bodies 260A, 260B. The torso 250 in one embodiment includes a trunk, neck and head. The arms 260A, 260B may include pins 371A, 371B (See FIG. 2) for attachment to a common shaft or other mechanisms, as described herein. Mannequins such as those used for CPR training may be used for the torso 250 and arms 260A, 260B. Portions of the core of the torso 250 may be hollow in order to allow space for various parts and mechanisms, as understood by one of ordinary skill in the art when viewing FIG. 1J.

Figure 3:
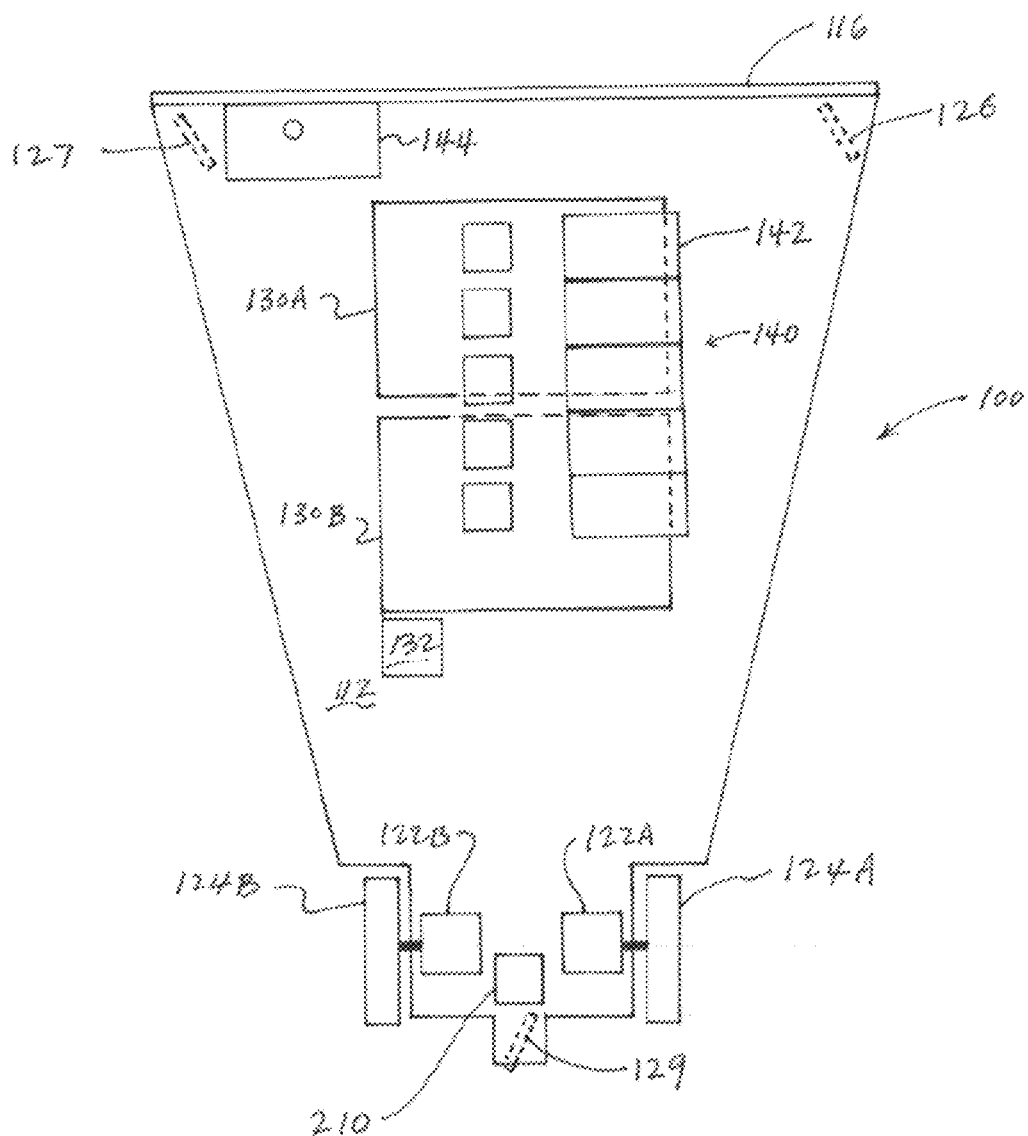
FIG. 3 is an illustration of a plan view of the chassis and various system elements on the vehicle subsystem of the robot athlete according to one exemplary embodiment.

The base column 210, as shown in FIG. 1J, is mounted near the front end of the chassis 112 (also shown in FIG. 3, in plan view). The base column 210 is sized and shaped to support the weight of the other elements under both static and dynamic loading conditions. In one embodiment, the base column 210 includes an aluminum rail that is approximately square in cross section. The base column 210 may have exemplary dimensions of about one and one-half inches by about one and one-half inches in cross section, and about twenty-four inches tall. It may be secured at its base by mounting brackets (not illustrated) to the chassis 112. The base column 210 extends upwardly from the chassis 112 along a substantially vertical axis.

The base column 210 may support a torso lift motor 152, as well as movable columns 220, 230. The movable columns 220, 230 may also support an arm lift motor 156 and a torso centering sensor 164. The torso 250 may be coupled to the movable columns 220, 230. The torso to 50 may also support a speaker 172. Further details about the torso lift motor 152 and the arm lift motor 156 will be described below in connection with FIGS. 6-7.

The chassis 112 may also support an arm speed control module 261, a wireless receiver 173 for supporting audio signals that are amplified with the amplifier 174 and projected by the speaker 172. The audio wireless receiver 173 may be wirelessly coupled to a headset 181 which may allow an operator of the robot athlete 101 to relay audio or voice instructions that are projected from the speaker 172 to any athletes engaging with the robot athlete 101.

The chassis 112 may further support a power supply such as batteries 130 and the PLC/CPU 142. The power supply is not limited to batteries 130 and it may include other sources of power like capacitors, solar cells, and combinations including capacitors, batteries and solar cells as understood by one of ordinary skill the art. The chassis 112 is coupled to a rear panel 116 which supports a second wireless receiver 144. The second wireless receiver 144 may be responsible for receiving commands issued by a remote control unit 180 such as for moving the robot athlete 101 that may include moving the chassis 112 in addition to rotating the torso 250 as well as rotating the arms 260.

The chassis 112 may also support optical sensors 167 that search for a track or a strip of polarized reflective tape 804, which will be described in further detail below in connection with FIGS. 8-9. The chassis 112 may also support driven wheel speed control units 125. The driven wheels speed control units 125 may allow the operator to set the minimum and maximum speeds for the voters which drive the driven wheels 124.

Figure 1K:
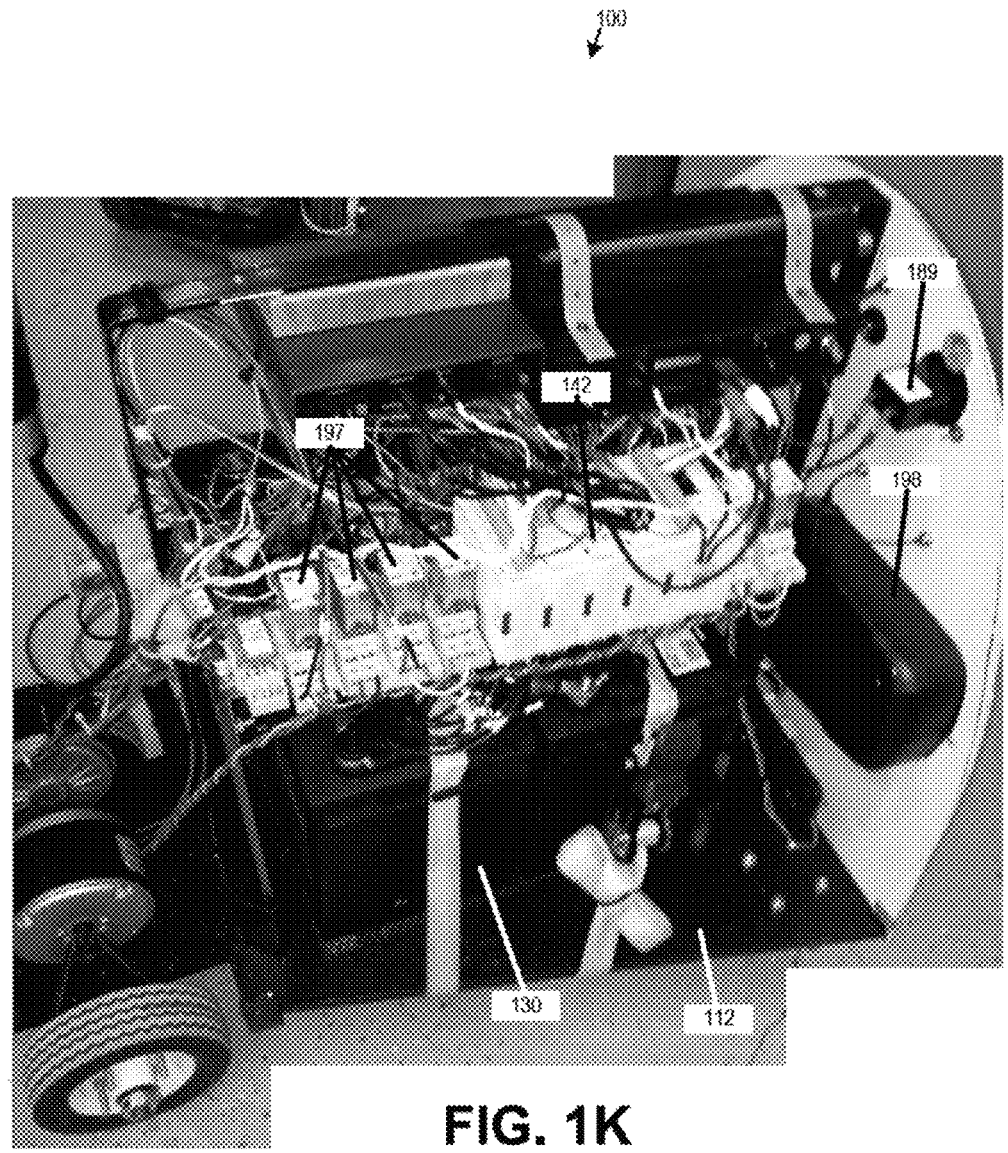
FIG. 1K is an illustration of a detailed, perspective view of the chassis and various system elements on the vehicle subsystem of the robot athlete, corresponding to FIG. 1J, according to one exemplary embodiment.

FIG. 1K is an illustration of a detailed, perspective view of the chassis 112 and various system elements on the vehicle subsystem 100 of the robot athlete 101, corresponding to FIG. 1J, according to one exemplary embodiment. The chassis 112 may support several different electrical relays 197 that may be coupled to the central processing unit/programmable logic controller 142. As noted previously, the chassis 112 may support motors 122, batteries 130, and the rear panel 112 which may have the timing operation meter 189. The rear panel 112 may also have an extension cord storage area 198 in some exemplary embodiments.

Figure 1L:
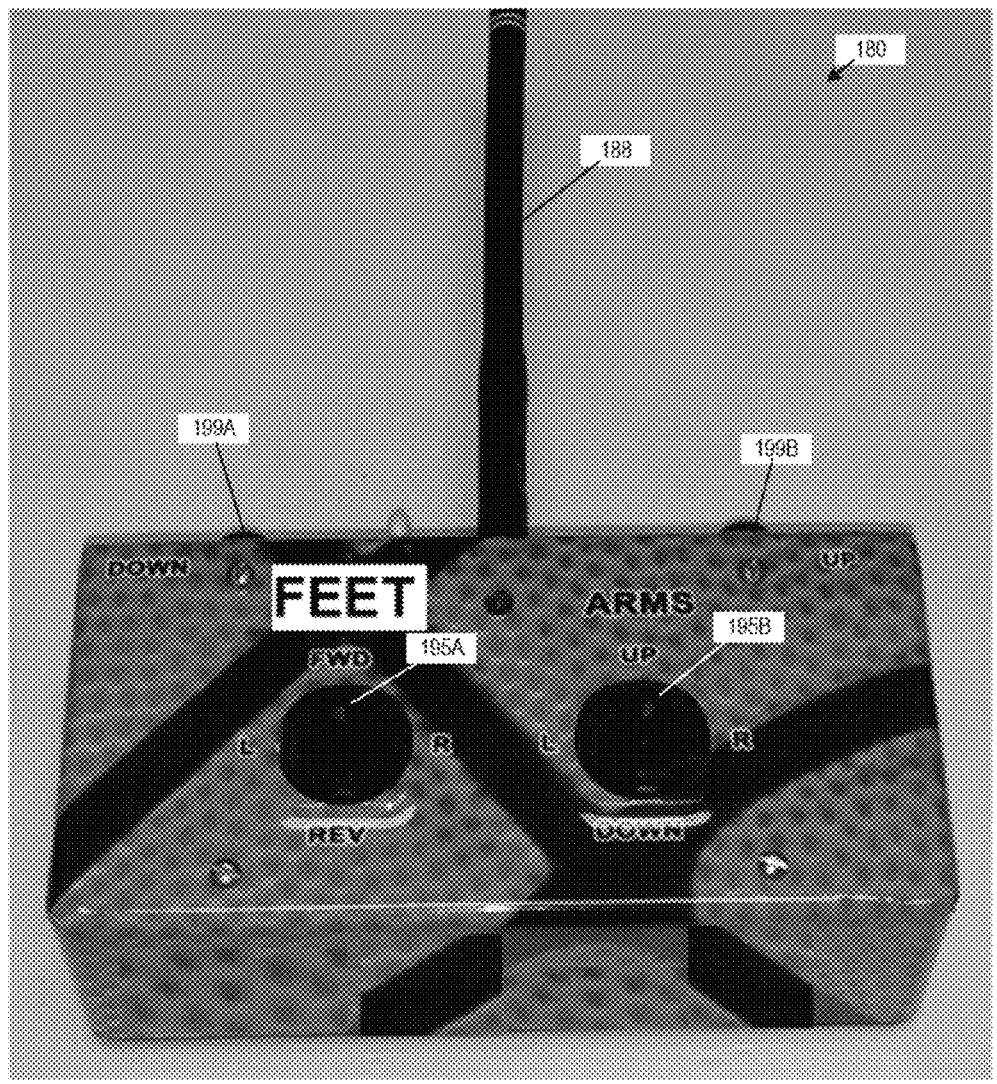
FIG. 1L is a view of a remote control console for the robot athlete according to one exemplary embodiment.

FIG. 1L is a view of a remote control console 180 for the robot athlete 101 according to one exemplary embodiment. The remote-control console 180 may comprise an antenna 196 that is coupled to a wireless transmitter present within the console 180. The user interface controls on the console 180 may include a microphone positioned on the remote console 180 or, in another exemplary embodiment, a microphone in a wireless headset 181 (See FIG. 1J) paired to operate with the remote console 180. In operation, the vehicle 100 may include an audio system that includes a speaker 172 (See FIG. 2) mounted, in one embodiment, on the front side of the torso-like body 250. In use, the operator of the remote console 180 using the microphone may send voice commands to the onboard speaker 172 in order to give direction, instructions, or other voice encouragement to the player.

The user interface controls on the remote console 180, in one embodiment, may include a first joystick 195A, a second joystick 195B (See FIG. 1L0, and a pair of push buttons. The first joystick 195A may be dedicated to controlling the motive system, by sending signals to the programmable control system 140 which, in turn, sends signals to the pair of drive motors 122A, 122B that turn the vehicle's driven wheels 124A, 124B. In operation, movement of the first joystick 195A forward or rearward causes the entire vehicle subsystem 100 to move forward or rearward. Movement of the first joystick 195A to the right or left causes the vehicle 100 to turn right or left.

The second joystick may 195B be dedicated to controlling the arm motor 156, by sending signals to the programmable control system 140 which, in turn, sends signals to the arm drive motor 156 to raise or lower the pair of arm-like bodies 260A, 260B. In operation, movement of the second joystick forward 195B (or up) causes the arm-like bodies 260A, 260B to move up. Movement of second joystick rearward 195B (or down) causes the arm-like bodies 260A, 260B to move down.

Also, the second joystick 195B may be dedicated to controlling the rotation of the torso-like body 250, by sending signals to the programmable control system 140 which, in turn, sends signals to the torso rotate motor 158 in order to turn the torso 250 clockwise or counter-clockwise. In operation, movement of the second joystick 195B to the left causes the torso-like body 250 to rotate counter-clockwise. Movement of the second joystick 195B to the right causes the torso-like body 250 to rotate clockwise.

The user interface controls on the remote console 180 may also include a pair of push buttons 199A, 199B that are dedicated to lifting and lowering the entire torso-like body 250 along a substantially vertical axis. In one embodiment, a first button 199B lifts the torso 250 by sending a signal to the programmable control system 140 which, in turn, sends a signal to the torso lift motor 152 to raise the torso. A second button 199A lowers the torso 250 by sending a signal to the programmable control system 140 which, in turn, sends a signal to the torso lift motor 152 to lower the torso 250.

While an independent and customized remote control console 180 is illustrated in FIG. 1L, it is apparent to one of ordinary skill the art that the remote control console 180 may be substituted with other portable computing devices, such as mobile telephones. In other words, a downloadable software application may be made available for a mobile phone in which the commands corresponding to the hardware controls illustrated in FIG. 1 may be incorporated into a graphical user interface on a mobile phone as understood by one of ordinary skill in the art.

Figure 2:
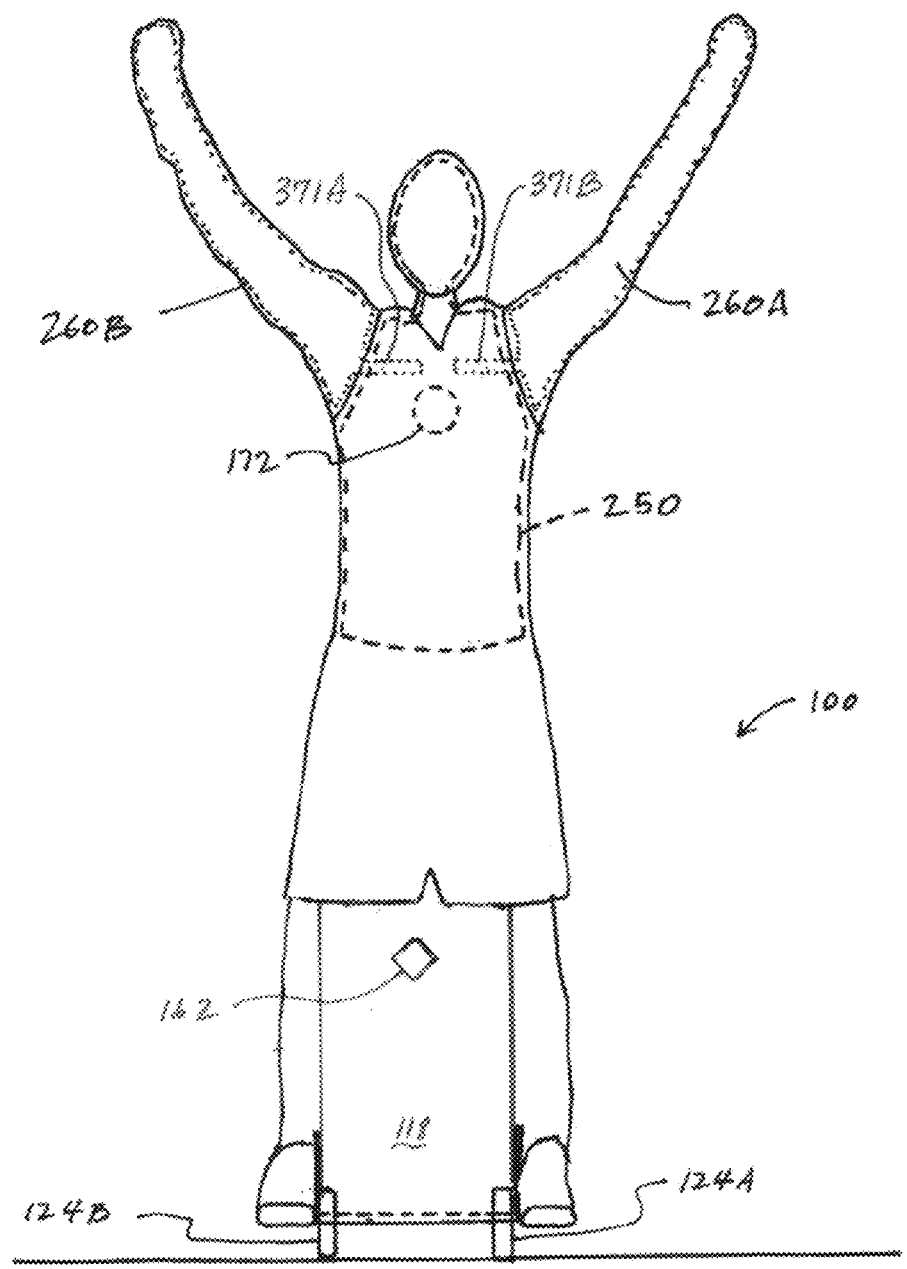
FIG. 2 is a front view of an anthropomorphic body supported by the vehicle subsystem which forms the robot athlete according to one exemplary embodiment.

FIG. 2 is a front view of an anthropomorphic body having arms extended and supported by the vehicle subsystem 100 which forms the robot athlete 101 according to one exemplary embodiment. The vehicle subsystem 100 has the chassis 112 that is supported above a floor surface by a pair of driven wheels 124A, 124B. The chassis 112 includes a column wrap 118 near a front region which corresponds with the feet of the anthropomorphic body. The chassis 112 supports the anthropomorphic body having a torso-like body 250 and a pair of arm-like bodies 260A, 260B shown in the extended position in FIG. 2.

The torso-like body 250 further includes a speaker 172 and collars 371a, 371b which are internal and which provide mechanical support for the shoulders of the torso-like body 250. Also illustrated in FIG. 2 is a first range detector 162A.

Motive System

FIG. 3 is an illustration of a plan view of the chassis 112 and various system elements on the vehicle subsystem 100 of the robot athlete 101 according to one exemplary embodiment. As shown, the chassis 112 is supported by a pair of driven wheels 124A, 124B, a single swivel caster 129 positioned near the narrower or front end of the chassis 112, and two swivel casters 126, 127 positioned near the rear end of the chassis 112. Each driven wheel 124 is coupled to a motor 122. Exemplary motors 122 include, but are not limited to, servomotors, alternating current ("A/C") current motors, direct current ("DC") current motors, etc.

As shown in FIG. 3, a first wheel 124A is engaged with a first motor 122A, and the second wheel 124B is engaged with a second motor 122B. In this aspect, the wheels 124A, 124B may be operated by independent motors, but in a coordinated manner as directed by the vehicle's programmable control system 142, described herein. Independent motor control facilitates tight-radius turns and precise navigation.

In one exemplary embodiment, each wheel 124A, 124B includes a sprocket and chain (not illustrated) that is engaged with a gear component driven by each motor 122A, 122B. In one embodiment, the vehicle subsystem 100 may include one or more drive motor controls (not shown) that are used to limit or otherwise control the speed of the vehicle subsystem 100.

The wheels 124 may support any kind of tire or tread that provides suitable fraction and durability for a particular sports field. For example, solid or inflatable tires may be used for a solid playing surface such as an indoor basketball or volleyball court, whereas all-terrain tires may be used for natural outdoor surfaces such as soccer fields.

The chassis 112 may further support a base column 210 which is coupled to the torso-like body 250. As noted previously, the rear end of the chassis 112 corresponds to the portion of the chassis that is not in direct line with the torso-like body 250. Meanwhile, the portion of the chassis 112 which is in direct line with the torso-like body 250, and which is closest to the feet, is referred to as the front end of the chassis 112.

Power System

The chassis 112 supports batteries 130a, 130b as well as a control system 140 that includes a programmable logic controller ("PLC") and/or central processing unit ("CPU") 142. Further details about the programs executed by the PLC/CPU 142 will be described below in connection with the flowcharts of FIGS. 10-13. The chassis may further support a battery charger 132 which is coupled to one or more of the batteries 130a, 130b. The vehicle subsystem 100 in various embodiments includes a power system for providing energy to all the onboard systems. The power system may include one or more batteries 130A, 130B, as shown in FIG. 1 and FIG. 3.

The batteries 130 may be replaceable and/or rechargeable, and are configured to cooperate with and deliver power to the various onboard systems described herein. In one embodiment, the power system includes a battery regulator to step the voltage down from about twelve volts to about five volts. The power system may also include a twelve-volt battery charger 132 (shown in FIG. 3) that may be connected to a wall socket using a cord and an adapter (housed in a compartment 198, See FIG. 1K described above) located on the rear panel 116 of the chassis. The power system may also include a cooling fan (not illustrated) positioned to cool selected components.

The power system may also include one or more indicators, located on the rear panel 116 or elsewhere, for displaying battery condition (e.g., "ready" and "charge"). In one exemplary embodiment, the power system includes a timer that allows the vehicle to operate for a set period of time before the time expires and disconnects the power.

Programmable Control System

Figure 4:
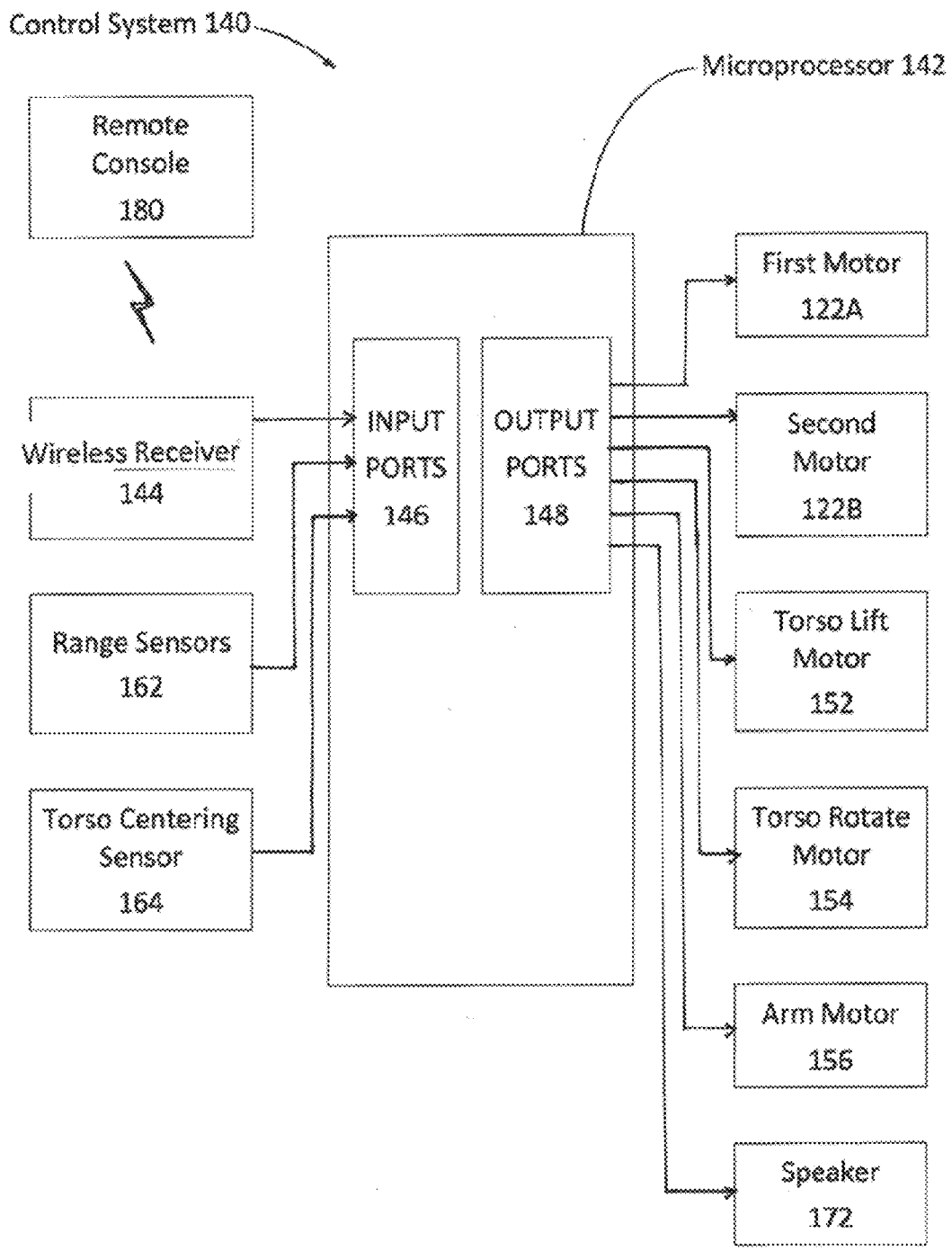
FIG. 4 is a control system diagram for the vehicle subsystem of the robot athlete according to one exemplary embodiment.

FIG. 4 is a control system diagram for the vehicle subsystem 100 of the robot athlete 101 according to one exemplary embodiment. As shown schematically in FIG. 4, the programmable control system 140 in various exemplary embodiments is connected to essentially all the other onboard systems. The programmable control system 140 in one embodiment includes a microprocessor 142 that can be configured or programmed using a computer. In one embodiment, the microprocessor 142 may be a microcontroller containing a processor, memory, and programmable input/output peripherals.

In one exemplary embodiment, the microprocessor 142 is a programmable logic controller (PLC), which is a digital computer containing a processor, a memory, input modules, output modules, and relays that are dedicated to specific mechanisms or servos. The microprocessor 142, as shown in FIG. 4, includes a number of input ports 146 and output ports 148. The input ports receive information from a remote control console 180 (See FIGS. 1J and 1L) via a wireless receiver 144, one or more range sensors 162, and a torso centering sensor 164.

The PLC or microprocessor 142 may receive input conditions, execute a system control program, and send the resulting signals to the designated output ports 148. As shown, the output ports 148 include connections, via dedicated relays 197 (See FIG. 1K), to the first and second drive motors 122A, 122B, the torso lift motor 152, the torso rotate motor 154, the arm motor 156, and a speaker 172. The speaker 172 may include one or more amplifiers or loudspeakers for processing audio signals and producing sound that is based on the audio signals produced by the headset 181 (See FIG. 1J). In operation, a system control program may be written and modified using a personal computer ("PC") and then uploaded to the PLC or microprocessor 142.

In one exemplary embodiment, the programmable control system 140 is configured to operate the vehicle subsystem 100 in either a manual mode or in an autonomous mode. The control system 140 may include a mode switch 190 (See FIG. 1I), located on the rear panel 116 of the chassis or on the remote control console 180. The mode switch 190 may receive a mode selection (e.g, Off, Manual, and Autonomous, etc.).

In one exemplary manual mode of operation for the robot athlete 101, the PLC or microprocessor 142 receives inputs from the remote control console 180, as shown in FIG. 1J and FIG. 1L. The remote control console 180 includes plurality of user interface controls and a wireless transmitter that is in communication with a wireless receiver 144 onboard the vehicle subsystem 100.

The wireless transmitter of the console 180 may include a plurality of channels for sending signals to the programmable control system 140 onboard the vehicle 100 subsystem. The user interface controls may include a main switch for receiving a selection (e.g., On, Off, and Charge). In one exemplary embodiment, the remote console 180 is wireless and may include a replaceable and/or rechargeable battery. As noted previously, the remote console 180 may be substituted with a mobile phone or other similar portable computing device as understood by one of ordinary skill the art.

Sensors

In autonomous mode, the PLC or microprocessor 142 receives inputs from one or more sensors 162A-C, 164, 167 as shown in FIG. 4. The sensors 162A-C, 164, and 167 are positioned on the vehicle subsystem 100 in locations and in orientations where the sensors can sense the approach and movements of objects, such as people. The sensors may include three range sensors 162A-C, a torso centering sensor 164, and optical sensors 167.

As described herein, the programmable control system 140 includes a PLC or microprocessor 142. The PLC or microprocessor 142 receives the input conditions from the sensors 162A-C, 164, 167, executes a system control program, and sends the resulting signals via designated output ports 148 to the drive motors, lift systems, and speaker 172. In operation, the system control program may be written and modified using a personal computer and then uploaded to the PLC or microprocessor 142.

The programmable control system 140 in one embodiment includes a plurality of predefined motion routines that are stored onboard in memory. Each motion routine includes a set of instructions for moving various portions of the anthropomorphic body having torso 250. A particular motion routine may be selected in response to inputs from the sensors 162A-C, 164, 167.

Figure 5:
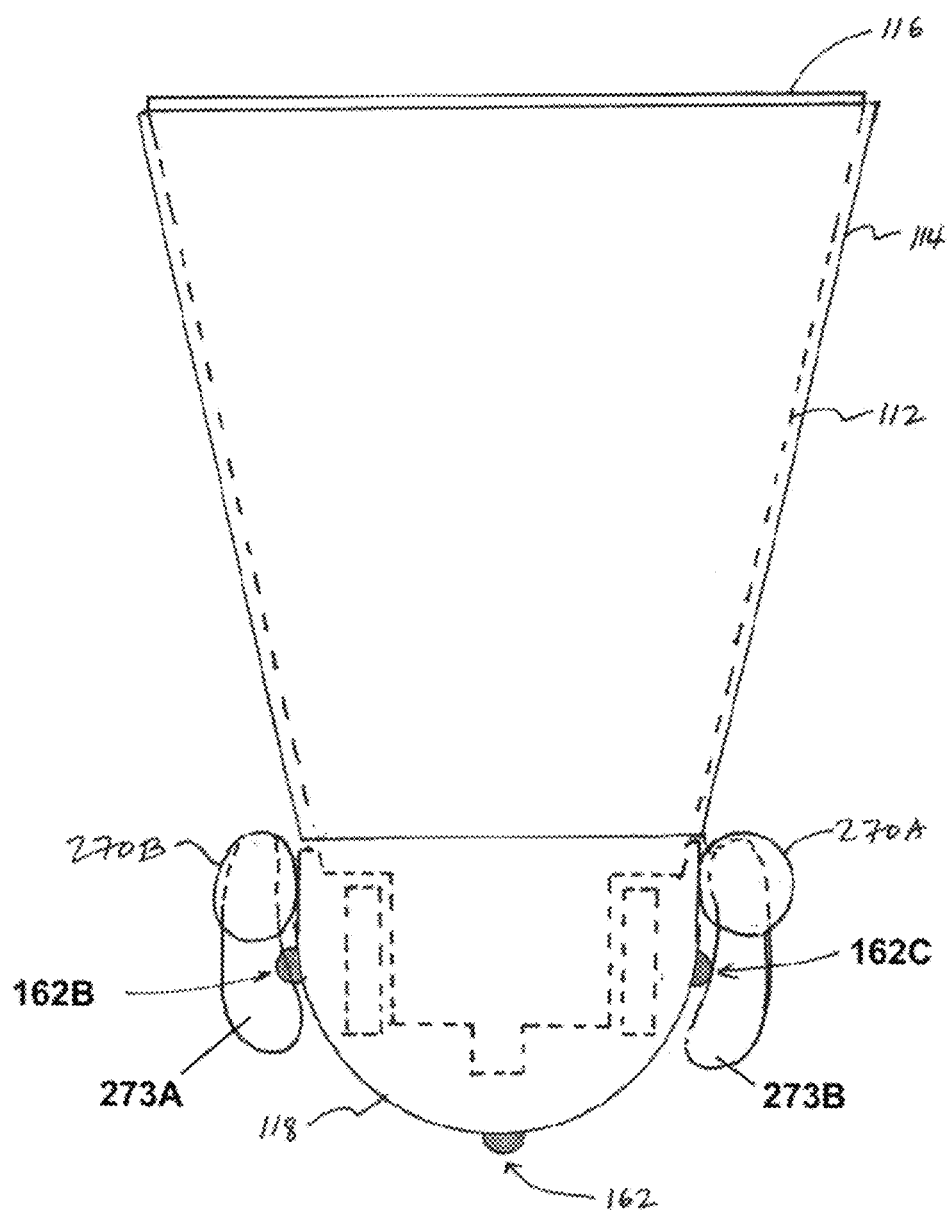
FIG. 5 is an illustration of a plan view of the chassis, showing the front column wrap of the robot athlete according to one exemplary embodiment.

The sensor system in particular embodiments may include one or more range sensors 162A-C, as shown in FIG. 5, and a torso centering sensor 164 (FIG. 1) for sensing the relative position of the torso 250. In one embodiment, as illustrated in FIG. 5, mounted to the column wrap 118 are a front range sensor 162A and a pair of side-mounted range sensors 162B-C. The range sensors 162A-C may include any of a variety of suitable sensors, such as optical sensors, ultrasonic sensors, or radio-frequency sensors. For example, the vehicle subsystem 100 may include ultrasonic range detectors that measure distances using sonar and interfaces with the programmable control system 140.

Referring back to FIG. 1J, a torso centering sensor 164 may be mounted to the top of the primary torso movable column 220, and positioned to sense the position of the secondary torso column 230 relative to the primary torso column 220. After the torso centering sensor 164 senses the relative position of the two columns 220, 230 and sends an input signal to the programmable control system 140, the programmable control system 140 may send an output signal to the torso rotate motor 154 to engage and rotate the secondary torso column 230 such that it is aligned with the primary torso column 220, thereby centering the torso-like body 250 into a desired position, such as forward facing and in alignment with the shoes 273 of the robot athlete 101.

As noted previously and referring now back to FIG. 4, the programmable control system 140 may be provided with a plurality of predefined motions as understood by one of ordinary skill the art. A first predefined motion routine may include instructions executed by the programmable control system 140 for moving the robot athlete 101 into a "Ready Position" when the sensors 162A-C detect an object approaching within a first threshold distance. The "Ready Position" may include moving the torso 250 into the lowest or base position, moving the arms 260A, 260B into their lowest position, and centering the torso 250 with the chassis 112 by rotating the secondary torso column 230 until it is substantially aligned with the primary torso column 220.

For example, if a basketball player approaches the front range sensor 162A within a first threshold distance (for example, 8 to 10 feet), then the control system 140 processes the input, selects the first predefined motion routine, and sends signals via the output ports 148 to execute the maneuvers necessary to place the robot athlete 101 into the Ready Position.

A second predefined motion routine may include instructions executed by the programmable control system 140 for moving the robot athlete 101 into an "Intermediate Position" when the sensors 162A-C detect an object approaching within a second threshold distance. The Intermediate Position may include moving the torso 250 into the lowest or base position, moving the arms 260A, 260B into an intermediate position, and centering the torso 250 if necessary.

For example, if a basketball player approaches the front range sensor 162A within a second threshold distance (for example, 3 to 4 feet), then the control system 140 processes the input, selects the second predefined motion routine, and sends signals via the output ports 148 to execute the maneuvers necessary to place the robot athlete 101 into the Intermediate Position.

A third predefined motion routine may include instructions executed by the programmable control system 140 for moving the robot athlete 101 into a "High Blocking Position" when the sensors 162A-162C detect an object approaching within a third threshold distance. The High Blocking Position may include moving the torso 250 into the raised or extended position, moving the arms 260A, 260B into a high position, and centering the torso 250 if necessary.

For example, if a basketball player approaches the front range sensor 162A within a third threshold distance (for example, 1 to 2 feet), then the control system 140 processes the input, selects the third predefined motion routine, and sends signals via the output ports 148 to execute the maneuvers necessary to place the robot athlete 101 into High Blocking Position.

The first, second, and third motion routines are just some examples of basic routines that can be accomplished by the robot athlete 101 without rotating the torso 250 from side to side. The control system 140 is further capable of storing and executing motion routines that include torso rotation.

A fourth predefined motion routine executed by the programmable control system 140 may include instructions for moving the robot athlete 101 into a "Ready Facing Position" when the sensors 162A-C detect an object approaching within a first threshold distance. The Ready Facing Position may include turning and moving the robot athlete 101 in the direction of the detected movement, moving the torso 250 into the lowest or base position, moving the arms 260A, 260B into their lowest position, centering the torso 250 if necessary, rotating the torso 250 to face the approaching object, and repeatedly oscillating the torso 250 back and forth through a relatively narrow angular range such as plus-or-minus ten degrees relative to the approaching player.

For example, if a basketball player approaches the front range sensor 162A within a first threshold distance (for example, 8 to 10 feet), then the control system 140 processes the input, selects the fourth predefined motion routine, and sends signals via the output ports 148 to execute the maneuvers necessary to place the robot athlete 101 into the Ready Facing Position.

A fifth predefined motion routine may include instructions executed by the programmable control system 140 for moving the robot athlete 101 into a "Guard Position" when the sensors 162A-C detect an object approaching within a second threshold distance. The Guard Position may include turning and moving the robot athlete 101 in the direction of the detected movement, moving the torso 250 into the lowest or base position, moving the arms 260A, 260B into an intermediate lowest position, centering the torso 250 if necessary, and rotating the torso 250 to face the approaching object (with or without continuing to oscillate).

For example, if a basketball player approaches the front range sensor 162A within a second threshold distance (for example, 3 to 4 feet), then the control system 140 processes the input, selects the fifth predefined motion routine, and sends signals via the output ports 148 to execute the maneuvers necessary to place the robot athlete 101 into the Guard Position.

A sixth predefined motion routine may include instructions executed by programmable control system 140 for moving the robot athlete 101 into a "Path Block Position" when the sensors 162A-C detect an object approaching within a third threshold distance—and when the side-mounted range sensors 162B, 162C detect an object attempting to move around and past the robot athlete 101. The Path Block Position may include turning and moving the robot athlete 101 in the direction of the detected movement, moving the torso 250 into the lowest or base position, moving the arms 260A, 260B into an intermediate lowest position, and rotating the torso 250 about ninety degrees, either clockwise or counter-clockwise.

For example, if a basketball player approaches the front range sensor 162A within a third threshold distance (for example, 1 to 2 feet), and the side-mounted range sensors 162B, 162C detect the player attempting to pass on the right side (as viewed from overhead), then the control system 140 processes the input, selects the sixth predefined motion routine, and sends signals via the output ports 148 to execute the maneuvers necessary to place the figure into Path Block Position with a ninety-degree pivot in the clockwise direction.

A seventh predefined motion routine may include instructions executed by the programmable control system 140 for moving the robot athlete 101 into a "Shot Block Position" when the sensors 162A-C detect an object approaching within a third threshold distance. The Shot Block Position may include turning and moving the robot athlete 101 in the direction of the detected movement, moving the torso 250 into the highest or extended position, moving the arms 260A, 260B into their highest position, and rotating the torso 250 to face the approaching object.

For example, if a basketball player approaches the front range sensor 162A within a third threshold distance (for example, 1 to 2 feet), then the control system 140 processes the input, selects the seventh predefined motion routine, and sends signals via the output ports 148 to execute the maneuvers necessary to place the robot athlete 101 into Shot Block Position.

Any number of predefined motion routines can be programmed and stored using the programmable control system 140 described herein. Variables including threshold distance, movement of the entire robot in response to the detected movement, torso lift position, arm position, and torso rotation, which can be re-programmed according to any of a variety of desired motion routines. The static or neutral position of the torso 250 and arms 260 can be defined, from the lowest to the highest position, or any intermediate position. In addition to static positions, the control system 140 may be used to program the torso 250 and arms 260 to engage in predefined maneuvers (such as the oscillating torso 250 in the Ready Facing Position described above).

FIG. 5 is an illustration of a plan view of the chassis 112, showing the front, curved column wrap 118 of the robot athlete 101 according to one exemplary embodiment. As shown, the chassis 112 includes a control system cover 114, the curved column wrap 118, and a rear panel 116 with controls as described above in connection with FIG. 1I. The curved column wrap 118 may be attached to the chassis 112 using one or more releasable clasps (not illustrated) to keep it closed. The curved column wrap 118 supports two leg-like bodies 270A, 270B (shown with shoes 273) that are mounted on opposite sides of the column wrap 118.

According to one exemplary embodiment, the legs 270A, 270B are not connected to the torso-like body 250, so the torso 250 is free to be raised and lowered without also raising and lowering the legs 270A, 270B. Also, as shown in FIG. 5, the curved column wrap 188 may include a front range sensor 162A and a pair of side-mounted range sensors 162B, 162C. These range sensors 162 may comprise acoustical sensing sensors, however, other types of sensors like photoelectric, and others may be employed without departing from this disclosure as understood by one of ordinary skill in the art.

Figures 6, 7:
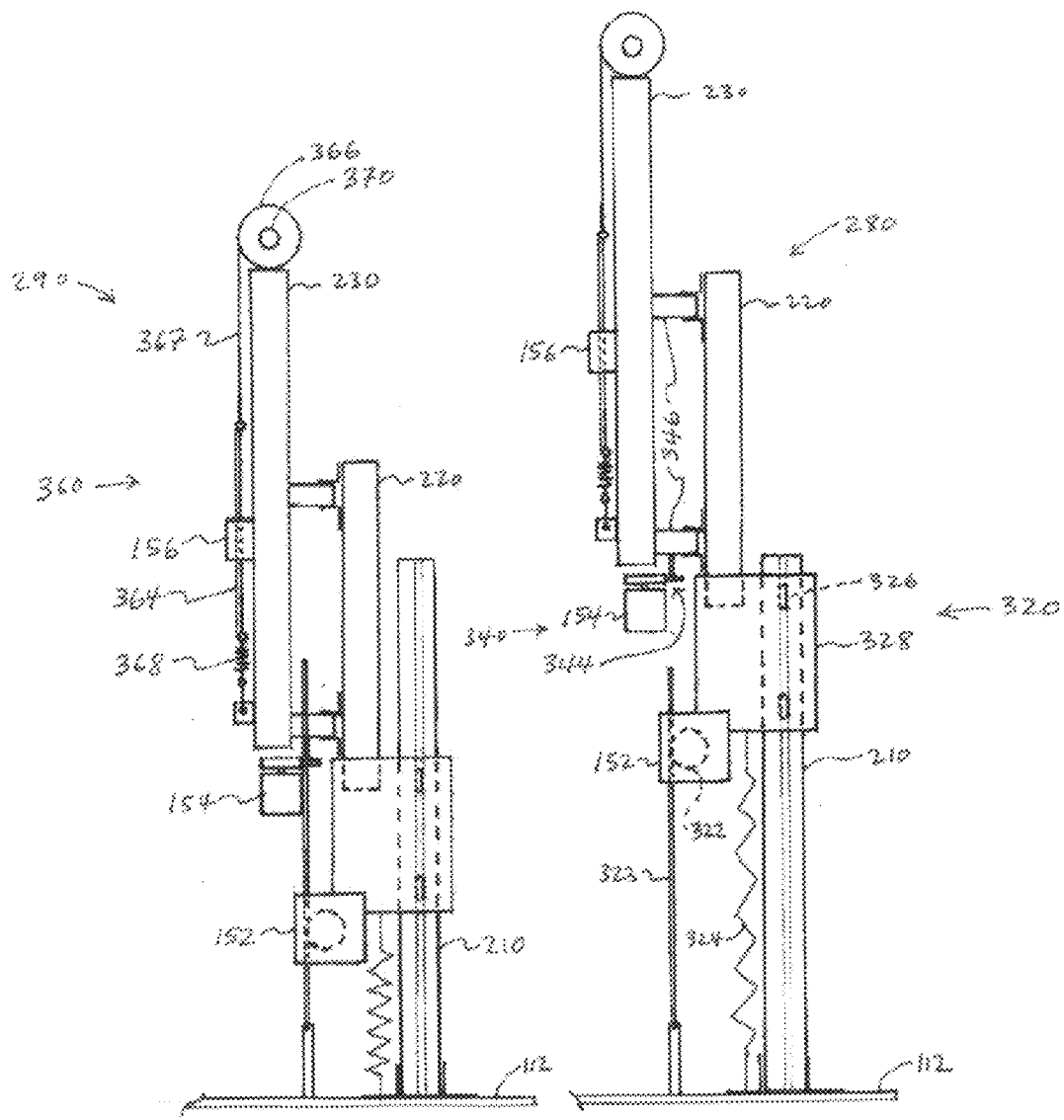
FIG. 6 is an illustration of a side view of a base column, a torso assembly, and an arm assembly, in a lowered or base position of the robot athlete according to one exemplary embodiment.
FIG. 7 is an illustration of a side view of a base column, a torso assembly, and an arm assembly, in a raised or extended position of the robot athlete according to one exemplary embodiment.

FIG. 6 is an illustration of a side view of a base column 210, a torso assembly 280, and an arm assembly 290, in a lowered or base position of the robot athlete 101 according to one exemplary embodiment. Further details about the torso assembly will be described below in connection with FIG. 7.

The arm assembly 290 includes a pair of arm-like bodies 260A, 260B (FIG. 2) connected to a common shaft 370 (FIG. 6). As illustrated in FIG. 2, the arms 260A, 260B may include pins 371A, 371B (See FIG. 2) that are sized and shaped to connect to the common shaft 370. An arm drive subsystem 360, as shown in FIG. 6, may be used to drive the shaft 370 in rotation about a substantially horizontal axis, in order to raise and lower the arms 260A, 260B.

The arm drive subsystem 360 in one exemplary embodiment, as illustrated in FIG. 6, includes an arm lift motor 156 configured to drive a chain 367 that is connected to a sprocket 366 on a shaft 370. Linear motion of the chain 367 imparts rotational motion to the sprocket 366 and, in turn, to the shaft 370. In one exemplary embodiment, the arm lift motor 156 includes a rack and pinion configuration. The teeth on a pinion 362 (not shown) inside the arm lift motor 156 engage with a rack 364. The top end of the rack 364 is connected to the chain 367. The bottom end of the rack 364 is connected in one embodiment to an arm spring assembly 368 that is biased in a direction that will assist the arm lift motor 156 in lifting the weight of the arms 260A, 260B. The arm spring assembly 368 may include a pair of springs, attached near the lower end of the secondary torso column 230.

In operation, the arm drive subsystem 360 rotates the shaft 370 and lifts the arms 260A, 260B. This arm lifting action emulates the act of a player raising his arms. The arm drive subsystem 360, together with the programmable control system 140 described herein, can be configured to position the arms 260 at any variety of positions, such as low, intermediate, and high positions. Mechanical equivalents of the structures shown in the FIGs. are apparent to one of ordinary skill in the art and within the scope of this disclosure.

FIG. 7 is an illustration of a side view of a base column 210, a torso assembly 280, and an arm assembly 290, in a raised or extended position of the robot athlete 101 according to one exemplary embodiment. The torso assembly 280, as shown in FIG. 7, includes a primary torso column 220 and a secondary torso column 230. The torso columns 220, 230 are sized and shaped to support the weight of the other elements under both static and dynamic loading conditions. In one embodiment, the torso columns 220, 230 are made of an aluminum rail that is approximately square in cross section. However, other materials besides metal and other shapes may be used for the columns 220, 230 as understood by one of ordinary skill in the art.

In one embodiment, the torso assembly 280 is slideably engaged with the base column 210, as illustrated in FIG. 6 and FIG. 7. The torso assembly 280 is selectively movable by a torso lift subsystem 320 from a lowered or base position (FIG. 6) to a raised or extended position (FIG. 7). The torso assembly 280, as shown, moves along a path that is substantially parallel to the vertical axis of the base column 210. In one embodiment, one or more bearings 326 are used to connect the torso assembly 280 to the base column 210. As shown in FIG. 6 and FIG. 7, the bearings 326 slide within a mating slot that runs along the length of the base column 210. The bearings 326 may include four individual bearings; a pair on each side of the base column 210. The torso assembly 280 also is coupled to the torso-like body 250, as shown in FIG. 2.

The torso lift subsystem 320, as shown in FIG. 7, in one exemplary embodiment includes a torso lift motor 152. Both the torso lift motor 152 and the primary torso column 220 may be mounted to a carriage 328, as shown. The carriage 328 may include a pair of plates; one positioned on each side of the base column 210. The bearings 326 described above may be attached to the carriage 328. The torso lift motor 152 is operative to rotate a lift pinion 322 that is engaged with a stationary rack 323. The lift pinion 322 may comprise a circular gear inside the torso lift motor 152. The pinion teeth of the lift pinion 322 may be engaged with the rack 323, which is a linear bar with gear teeth. The rotational motion of the lift pinion 322 causes the rack 323 to move in a linear direction.

The rack 323 is described as stationary because it is mounted to the chassis 112. This rack and pinion configuration allows the lift pinion 322 and motor 152 to lift (and lower) the entire torso assembly 280. The torso lift subsystem 320 may also include a spring assembly 324 that is biased in a direction that will assist the torso lift motor 152 in lifting the weight of the torso assembly 280. As shown (graphically) in FIG. 6, the spring assembly 324 may be attached to the chassis 112.

In operation, as illustrated in FIG. 6 and FIG. 7, the torso lift subsystem 320 lifts the torso assembly 280, including the torso-like body, head and arms, from a base position (FIG. 6) to an extended position (FIG. 7). This lift action emulates the act of a player stretching and/or leaping upward. The torso lift subsystem 320 may comprise other mechanical equivalents not necessarily described but as understood by one of ordinary skill in the art.

In another aspect, the torso assembly 280 may also include a torso rotate subsystem 340. As illustrated in FIG. 7, the torso rotate subsystem 340 in one exemplary embodiment includes a torso rotate motor 154 that is positioned to engage with and rotate the secondary torso column 230 relative to the primary torso column 220. The torso rotate motor 154 may be attached (not shown) to the carriage 328. The columns 220, 230 may be connected by one or more hinges 346. As shown in FIG. 7, the torso rotate motor 154 may include a driven gear 344 that is connected to the secondary torso column 230.

As shown, the driven gear 344 may be connected to one or more hinges 346 by a post or shaft. Operation of the motor 154 rotates the driven gear 344 which, in turn, rotates the secondary torso column 230 about an axis that is substantially parallel to the primary torso column 220.

In operation, the torso rotate subsystem 340 rotates the torso assembly 280, including the torso-like body, head and arms, from side to side. This rotating action emulates the act of a player turning his or her body.

Figure 8A:
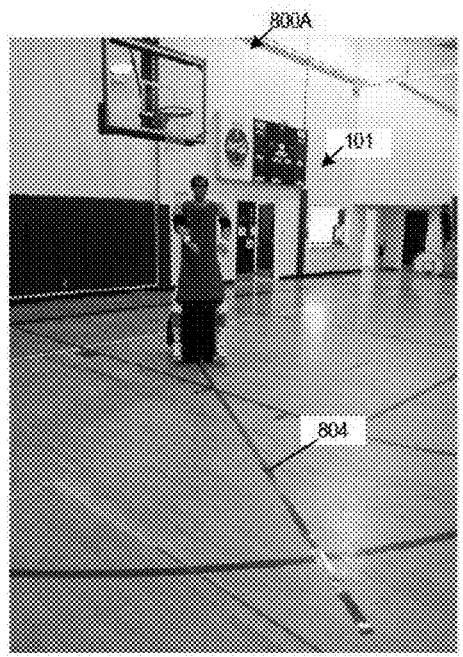
FIG. 8A illustrates a first position of the robot athlete according to a predetermined movement program also referred to as a pursuit mode of operation according to one exemplary embodiment.

FIG. 8A illustrates a first position of the robot athlete 101 according to a predetermined movement program also referred to as a pursuit mode of operation according to one exemplary embodiment. This first position of the robot athlete is located at a first end of a track 804. According to one exemplary embodiment, the track 804 may comprise an about 2-inch wide strip of polarized reflective tape that is coupled to a portable rubber strip. The track 804 may be folded in about 2-foot length sections for storage/transport and may of a total length of approximately 10 feet. However, other sizes and shapes for track 804 may be employed without departing from this disclosure as understood by one of ordinary skill in the art.

The optical sensors 167 described above use the track 804 to keep the robot athlete 101 aligned with the track 804 when the robot athlete 101 is propelled across a surface. The first position in this pursuit mode of operation in which the robot athlete 101 moves along the track 804 may be located at a first end of the track 804 which is positioned adjacent to a basket ball hoop as illustrated in FIG. 8A.

Figure 8B:
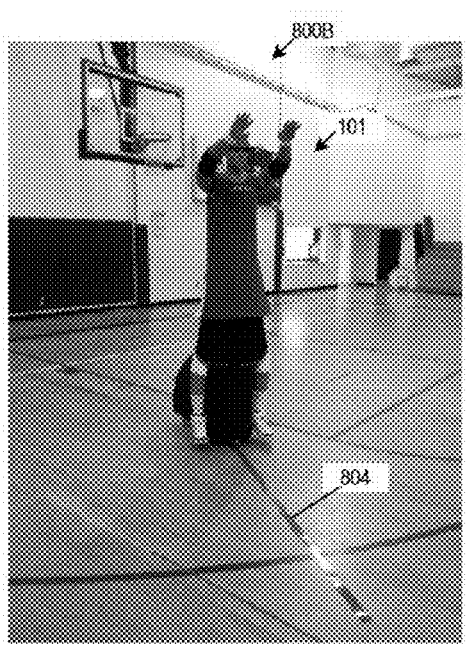
FIG. 8B illustrates a second position of the robot athlete according to a predetermined movement program also referred to as a pursuit mode of operation according to one exemplary embodiment.

FIG. 8B illustrates a second position of the robot athlete 101 according to a predetermined movement program also referred to as a pursuit mode of operation according to one exemplary embodiment. The robot athlete 101 has been moved down the track 804 away from the first position of FIG. 8A which was positioned underneath the basket ball hoop or goal. While the robot athlete moved down the track 804, his torso 250 was raised and his arms 260 were also started to be raised compared to the first position of FIG. 8A.

Figure 8C:
FIG. 8C illustrates a third position of the robot athlete according to a predetermined movement program also referred to as a pursuit mode of operation according to one exemplary embodiment.

FIG. 8C illustrates a third position of the robot athlete 101 according to a predetermined movement program also referred to as a pursuit mode of operation according to one exemplary embodiment. In this exemplary embodiment, the arms 260 and torso 250 where again raised further compared to the second position of FIG. 8B as the robot athlete moved down the track 804 away from the first position. This movement of the robot athlete 101 may simulate a regular athlete running down a court, and jumping to block a shot as understood by one of ordinary skill in the art.

Figure 8D:
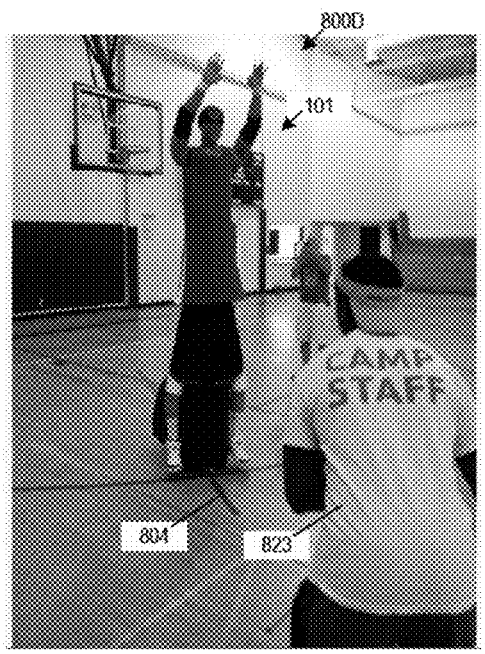
FIG. 8D illustrates a fourth position of the robot athlete according to a predetermined movement program also referred to as a pursuit mode of operation according to one exemplary embodiment.

FIG. 8D illustrates a fourth position of the robot athlete 101 according to a predetermined movement program also referred to as a pursuit mode of operation according to one exemplary embodiment. In this exemplary embodiment, the robot athlete 101 has almost reached the second end of the track 804 which is opposite to the first end of the track 804 mentioned above in FIG. 8A.

The robot athlete 101 at this position has almost reached his fully extended capacity for both his torso 250 and his arms 260 which simulates jumping of a defender about to block a shot. Also illustrated in this FIG. 8D is a human athlete 823 who may attempt to shoot or move around the robot athlete 101 in order to simulate a game scenario, and in this exemplary embodiment, a basket ball game scenario.

FIG. 9A is a schematic that illustrates a first position of the game jersey 251 relative to the game shorts 252 when the torso 250 of the robot athlete 101 is extended according to one exemplary embodiment. The game jersey 251 may comprise a ring 902 that keeps the material of the game jersey 251 in flared like configuration, similar to a bottom of a geometrical cone. The ring 902 may comprise a wire while the material for the jersey 251 may comprise ordinary materials such as cotton, and/or a cotton blend/weave. The ring 902 may be enclosed and sewn into the game jersey 251 or it may be attached to the jersey 251 by other mechanical means as understood by one of ordinary skill in the art.

FIG. 9B is a schematic that illustrates a second position of the game jersey 251 relative to the game shorts 252 when the torso 250 of the robot athlete 101 is extended according to one exemplary embodiment. This figure demonstrates how the game jersey 251 does not bunch up or have any frictional contact with the game shorts 252 so that the game jersey 251 may be maintained in an atheistically pleasing fashion during movement of the torso 250 which can occur frequently as desired by an operator of the robot athlete 101. The game jersey 251 may be extended across a distance D1 so that the game shorts 252 always remain visible and enhance the aesthetically pleasing view of the combination of the game jersey 251 and game shorts 252 being worn by the robot athlete 101.

Figure 9C:
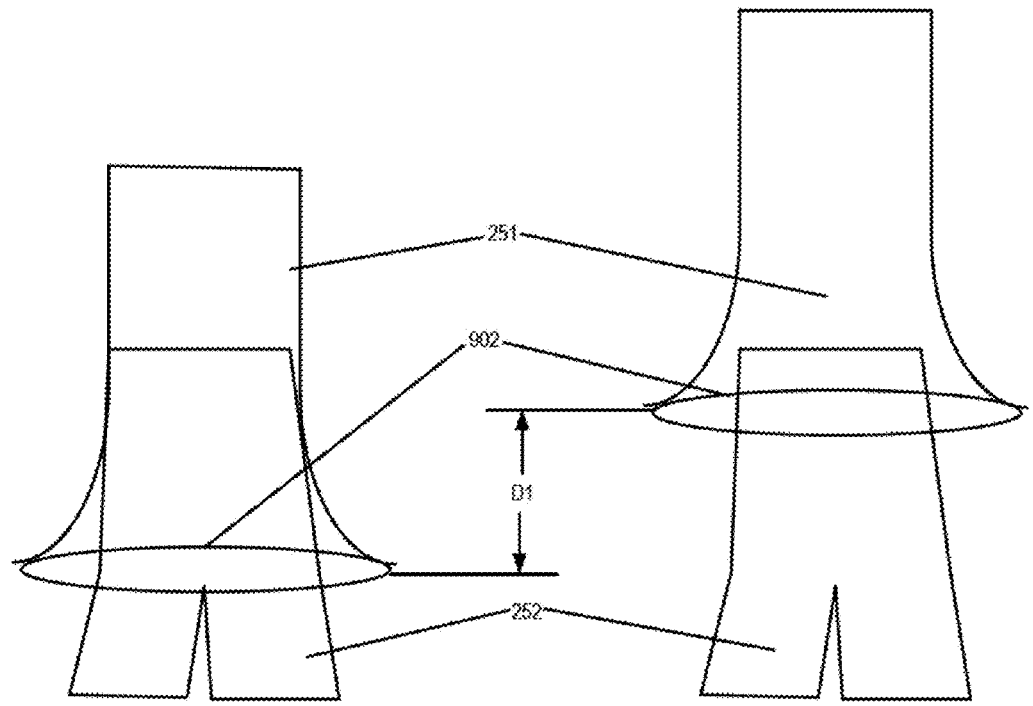
FIG. 9C is a top view of the robot athlete and the corresponding locations/orientations of respective acoustic sensors according to one exemplary embodiment.
Figure 9C:
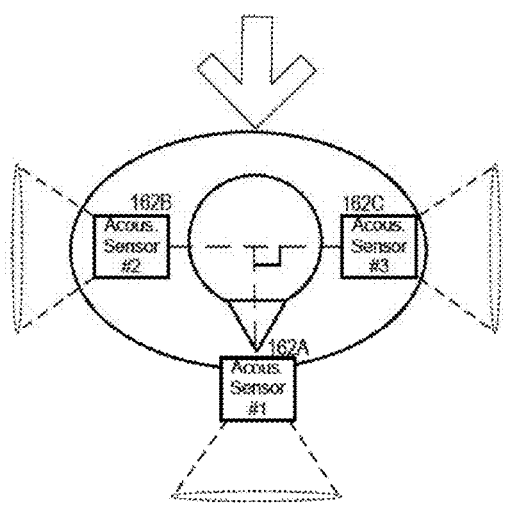

FIG. 9C is a top view of the robot athlete and the corresponding locations/orientations of respective acoustic sensors 162 according to one exemplary embodiment. The acoustic sensors 162 may be disposed at ninety degree angles relative to each other so that the robot athlete 101 may detect movement across a range of at least greater than 180 degrees as understood by one of ordinary skill in the art.

Figure 9D:
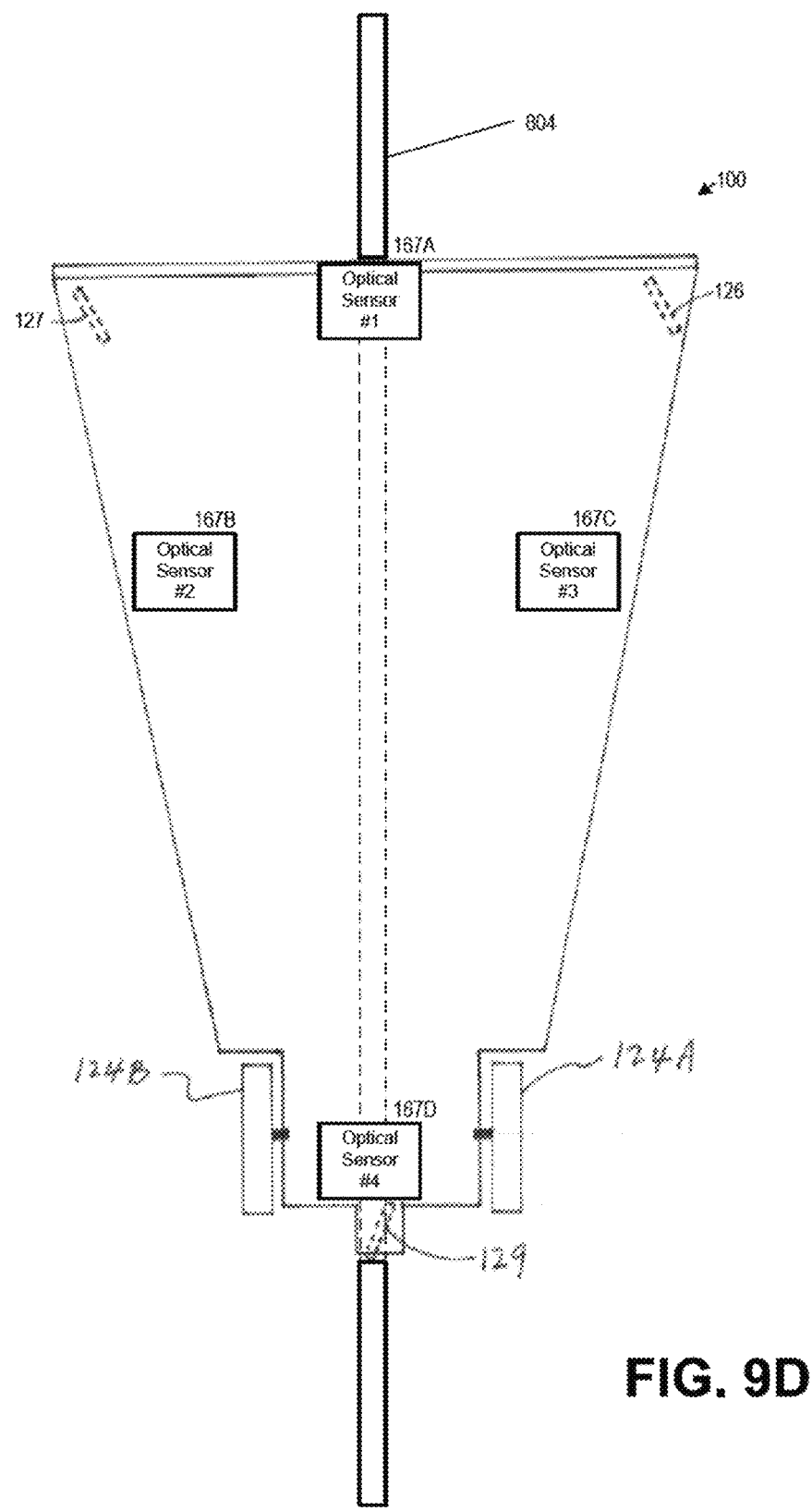
FIG. 9D is a top view of the vehicle subsystem and corresponding locations/orientations of respective optical sensors according to one exemplary embodiment.

FIG. 9D is a top view of the vehicle subsystem 100 and corresponding locations/orientations of respective optical sensors 167 according to one exemplary embodiment. The optical sensors 167A-D may be positioned such that a first sensor 167A and a second sensor 167D are in alignment with the track 804 as the robot athlete 101 traverses up and down the track, which may be a strip of polarized reflective tape of variable length prepositioned on a playing court in relation to the offensive goal.

Meanwhile, the second and third sensors 167B, 167C may be positioned on opposing sides of the track 804 in order to allow the robot athlete 101 to adjust its movement if one of these opposing sensors 167B, 167C detects the track 804. In other words, if one of the opposing sensors 167B, 167C detects the track 804, then this usually means the robot athlete 101 is veering off the track 804. The opposing sensors 167B, 167C allow the CPU/PLC 142 to make minor corrections of the lateral movement of the robot athlete 101 as it is traversing up and down the track 804.

Figure 10:
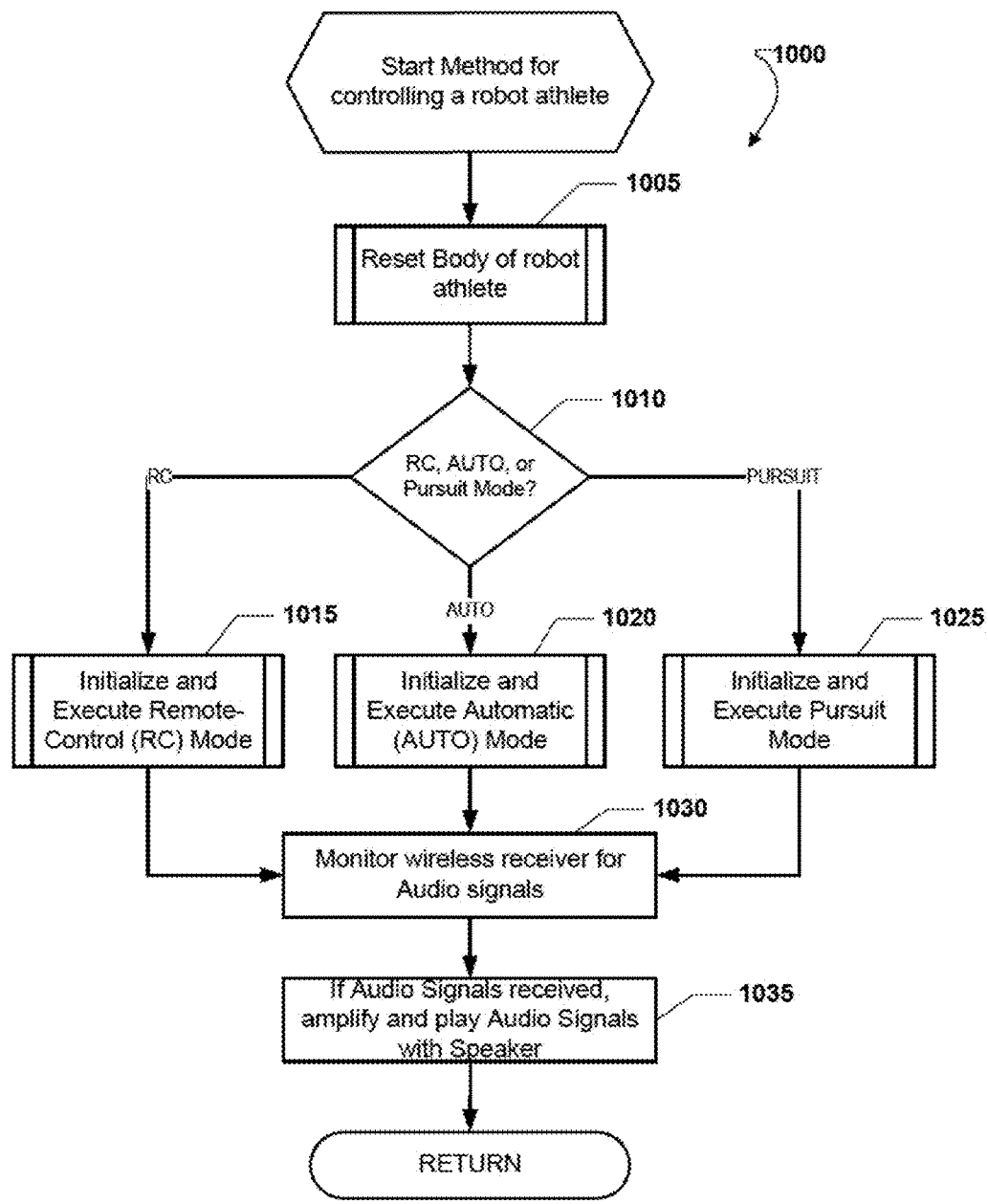
FIG. 10 is a logical flow chart illustrating a method for controlling a robot athlete according to one exemplary embodiment.

FIG. 10 is a logical flow chart illustrating a method 1000 for controlling a robot athlete 101 according to one exemplary embodiment. Routine or submethod block 1005 is the first step of method 1000. In this routine block 1005, the body of the robot athlete 101 may be reset. As described above, a reset for the body of the robot athlete 101 may include returning all movable parts to non-extended, neutral positions in which the arms 260 and the torso 250 are placed in non-extended positions. If the torso 250 is not in alignment with the shoes 273 of the robot athlete 101, then the torso 250 is rotated until such an orientation is achieved.

Next, in decision block 1010, it is determined which mode of operation has been selected for the robot athlete 101. Decision block 1010 may correspond with the mode selection switch 190 described above in connection with FIG. 1I. However, in other exemplary embodiments, the mode selection switch 190 may be embodied in software and/or hardware as an electronic switch that may be selected by an operator and/or by a program running on the central processing unit 142.

If the inquiry to decision block 1010 is remote control mode ("RC" mode), then the RC branch is followed to subroutine block 1015. In subroutine block 1015 a remote control mode of operation is initialized and executed by the central processing unit 142. Further details of subroutine block 1015 will be described below in connection with FIG. 11.

If the inquiry to decision block to 1010 is an automatic mode of operation ("Auto" mode), then the "AUTO" branch is followed to block 1020 in which an automatic mode of operation is initialized and executed by the central processing unit 142. Further details of routine block 1020 will be described below in connection with FIG. 12.

If the inquiry to decision block 1010 is a pursuit mode of operation ("Pursuit" mode), then the "Pursuit" branch is followed to subroutine block 1025. In subroutine block 1025, a pursuit mode of operation is initialized and executed by the central processing unit 142. Further details of subroutine block 1025 will be described below in connection with FIG. 13.

Subsequently, in block 1030, the central processing unit 142 may monitor the wireless receiver for any audio signals produced by the remote control 180 and/or headset 181. As noted previously, an operator of the remote control console 180 may provide speech that is amplified and projected with the speaker 172 as an additional training tool for use with the robot athlete 101.

Next, in block 1035, if audio signals are received, they may be amplified in played through the audio speaker 172 as described above. The process then returns to the first block 1005.

FIG. 11 is a logical flowchart illustrating a submethod/routine 1015 of the method 1000 of FIG. 10 for controlling a robot athlete 101 in a remote control mode according to one exemplary embodiment. Block 1105 is the first block of routine 1015.

In block 1105, the central processing unit 142 may monitor the wireless receiver 144 for commands from the remote control console 180. As described above in connection with FIG. 1L, such commands may include, but are not limited to, forward, left, right, reverse, arms up, arms left, arms right, arms down, torso up, and torso down.

If any commands are received, then in block 1110, the CPU 142 may route the commands activate appropriate subsystems of the robot athlete 101 such as the arms to 60, torso 250, and the driven wheels 124. The process then returns to block 1030 of FIG. 10.

Figure 12:
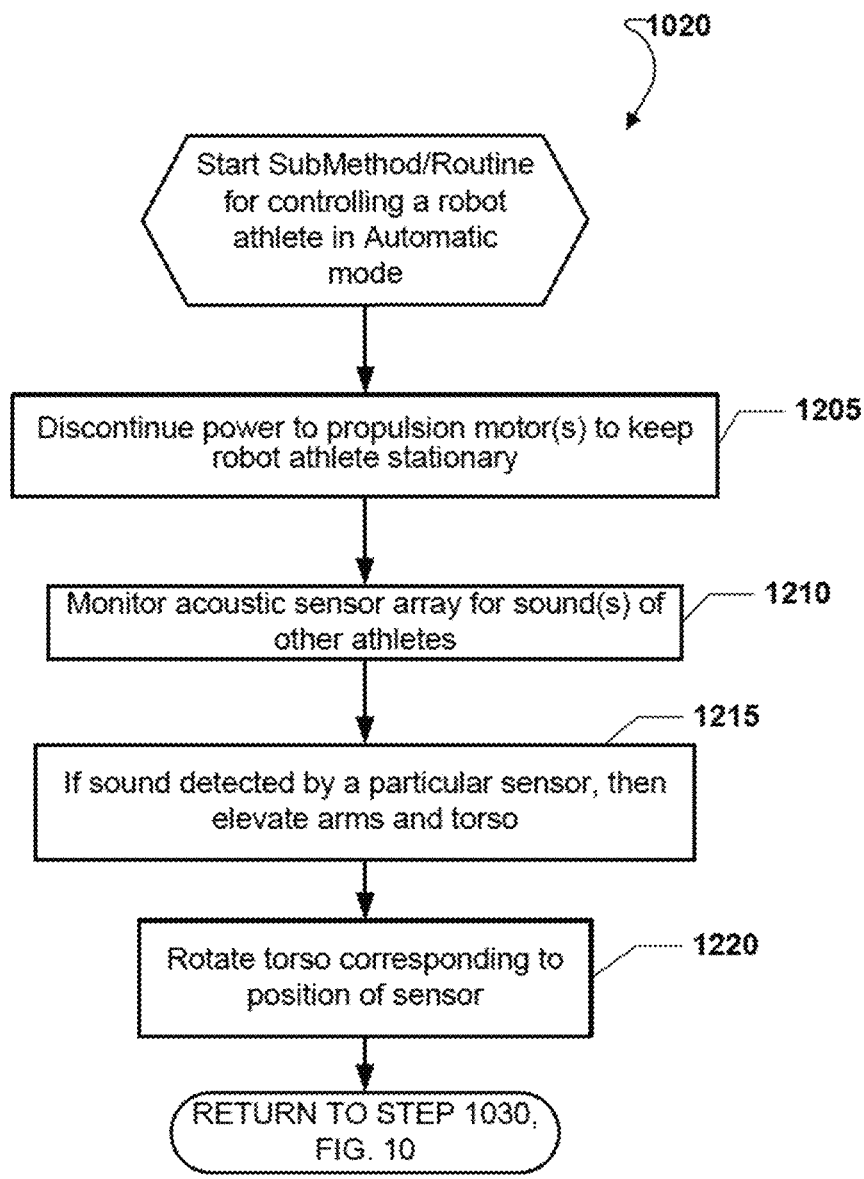
FIG. 12 is a logical flowchart illustrating a submethod/routine of the method of FIG. 10 for controlling a robot athlete in an automatic mode according to one exemplary embodiment.

FIG. 12 is a logical flowchart illustrating a submethod/routine 1020 of the method 1000 of FIG. 10 for controlling a robot athlete 101 in an automatic mode according to one exemplary embodiment. Block 1205 is the first step of routine 1020.

In block 1205, power to the propulsion motors such as motors 122, is discontinued so that the robot athlete 101 remains in a single location. Next, in block 1210, the central processing unit 142 monitors the acoustic sensor array 162 for any sounds of one or more athletes that may be approaching the robot athlete 101.

In block 1215, if sound is detected by a particular sensor 162, then the central processing unit 142 may elevate the arms 260 and the torso 250. Next, in block 1220, the central processing unit may rotate the torso 250 corresponding to the position of a sensor 162 that detected a sound. In other words, if a right acoustic sensor 162b detects a sound, then the central processing unit 142 may rotate the torso by 90° towards the original orientation of the sensor 162 which detected the sound. The process then may return to block 1030, FIG. 10.

Figure 13:
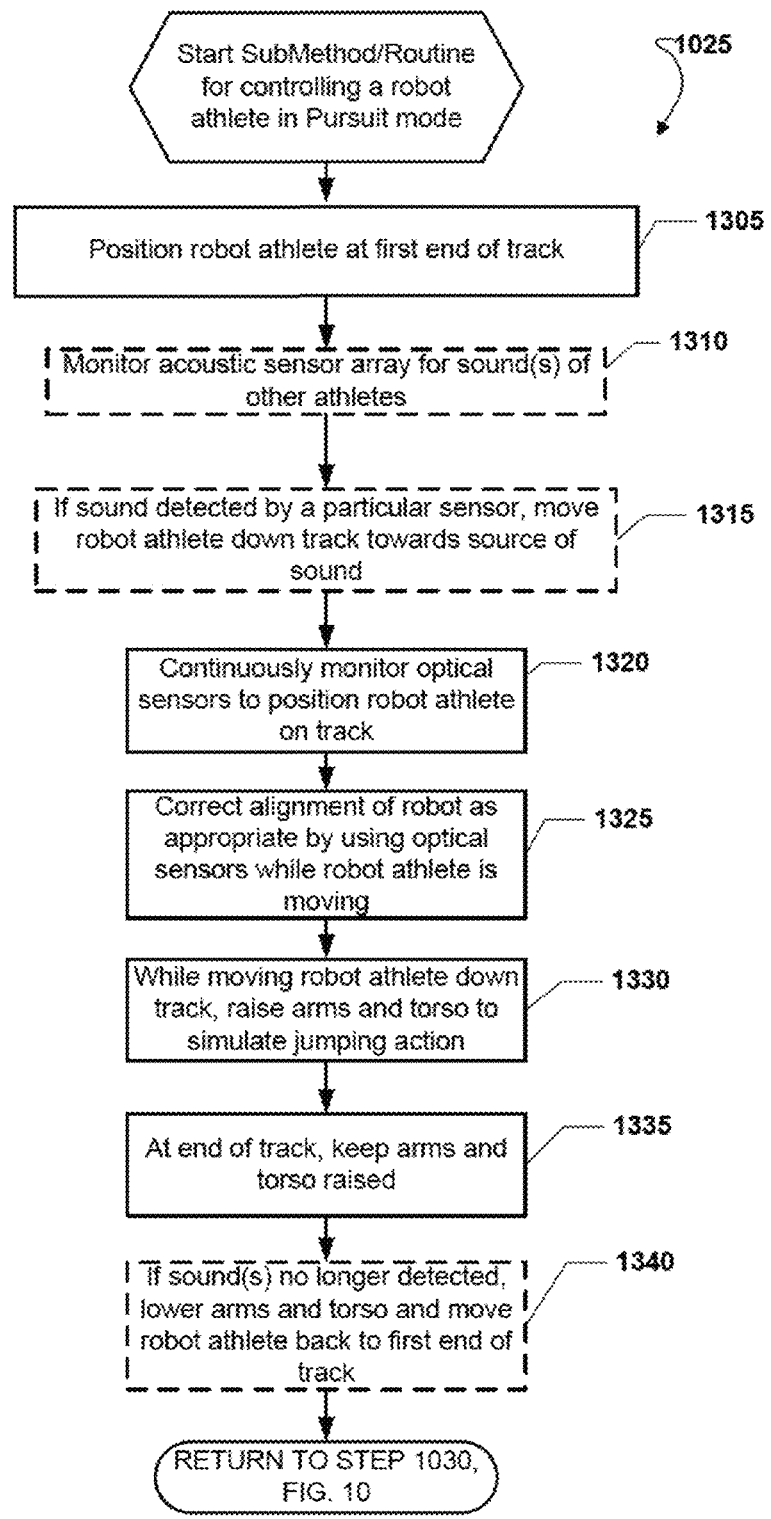
FIG. 13 is a logical flowchart illustrating a submethod/routine of the method of FIG. 10 for controlling a robot athlete in a pursuit mode according to one exemplary embodiment.

FIG. 13 is a logical flowchart illustrating a submethod/routine 1025 of the method 1000 of FIG. 10 for controlling a robot athlete 101 in a pursuit mode according to one exemplary embodiment. Block 1305 is the first step of routine 1025.

In block 1305, the robot athlete 101 may be positioned by the central processing unit at a first and of a track 804 as illustrated in FIG. 8A. Next, in optional block 1310, the central processing unit 142 may monitor the acoustic sensor array 162 for sounds of one or more athletes. Optional block 1310 has been highlighted with dashed lines to indicate that in some exemplary embodiments, this particular block 1310 may be skipped or not practiced as understood by one of ordinary skill the art. In exemplary embodiments where this block 1310 is skipped, the pursuit mode of operation may comprise a routine of commands that are repeated over time and are not executed in response to any environmental conditions.

Next, in optional block 1315, if a sound is detected by a particular sensor 162, the central processing unit 142 may move the robot athlete 101 down the track data for towards a source of the sound as illustrated in FIG. 8B. Similar to block 1310, block 1315 has been illustrated with dashed lines to indicate that it is also optional when sensors 162 are not used to activate movement of the robot athlete 101.

Next, in block 1320, the central processing unit 142 may continuously monitor the optical sensors 167 in order to position the robot athlete 101 on the track 804 as illustrated in FIGS. 8A-D. In block 1325, the central processing unit 142 may correct the alignment of the robot athlete as appropriate by using the optical sensors 167 while the robot athlete is moving across the track 804 as illustrated in FIGS. 8A-8D. For example, if one of the left or right optical sensors 167C, 167D were to detect the track 804, then an opposing wheel motor 122 may be activated in order to correct this misalignment of the robot athlete 101 relative to the track 804.

In block 1330, while the central processing unit 142 is moving the robot athlete 101 down the track 804, the central processing unit 142 may raise the arms 260 and the torso 250 in order to simulate jumping action of a real athlete as illustrated in FIGS. 1E-1H, and 8B-8D. In block 1335, at the end of the track 804, the central processing unit 142 may keep the arms 260 and the torso 250 raised.

Subsequently, in optional block 1340, if sounds are no longer detected by the acoustic array 162, the central processing unit 142 may lower the arms 260 and the torso toner 50 and then move the robot athlete 101 back to the first end of the track 804 as illustrated in FIG. 8A. Optional block 1340 has been illustrated with dashed lines to indicate it may not be practiced in some exemplary embodiments. Optional block 1340 would usually not be practiced in those exemplary embodiments in which the movement of the robot athlete 101 is controlled as a function of time instead of in reaction to detecting a presence of other athletes. The process then returns to block 1030, FIG. 10.

One of ordinary skill in the art will appreciate that the present invention may be implemented in other computer system configurations, including hand-held devices, multiprocessor systems, microprocessor based or programmable consumer electronics, network personal computers, minicomputers, tablets (e.g., iPad) mainframe computers, and the like. The invention may also be practiced in distributed computing environments, where tasks are performed by remote processing devices that are linked through a communications network. In a distributed computing environment, program modules may be located in both local and remote memory storage devices.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example.

Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the figures which may illustrate various process flows.

In one or more exemplary aspects, the functions described may be implemented in hardware, software, firmware, or any combination thereof. Thus, various combinations of hardware and/or software may be employed without departing from the inventive system and method described herein.

If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source, such as in "cloud" computing, using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Although selected aspects have been illustrated and described in detail, it will be understood that various substitutions and alterations may be made therein without departing from the spirit and scope of the present invention, as defined by the following claims.

What is claimed is:

1. A robot athlete comprising:
   a vehicle subsystem for propelling the robot athlete;
   an anthropomorphic body coupled to the vehicle subsystem, the anthropomorphic body being adjustable to a plurality of heights;
   the anthropomorphic body further comprising a head and arms, the arms being adjustable to a plurality of positions so as to simulate a blocking action of an athlete;
   a chassis which is part of the vehicle subsystem and is supported by a plurality of wheels;
   a power system supported by said chassis and providing energy to power said vehicle subsystem;
   a motive system supported by said chassis, activated by a control system, and operative to propel said vehicle by engagement with one or more of said plurality of wheels;

a base column mounted to and extending upwardly from said chassis along a substantially vertical axis;

a torso assembly comprising a primary torso column and secondary torso column, the secondary torso column being slideably engaged with said base column, wherein said torso assembly is selectively movable via a first motor of a torso lift subsystem from a base position to an extended position along a path that is substantially parallel to said vertical axis, the secondary torso column being coupled to the base column with a bearing, the secondary torso column being slideably engaged with the primary torso column, the torso assembly comprising a second motor coupled to the primary torso column and the secondary torso column for rotating the secondary torso column relative to the primary torso column;

an arm assembly connected to said torso assembly wherein said arm assembly is selectively rotatable by an arm drive subsystem about a substantially horizontal axis in order to move the arms; and a programmable control system supported by said chassis and electrically connected to said power system, said motive system, said torso lift subsystem, and said arm drive subsystem, wherein said programmable control system comprises a microprocessor, a wireless receiver, and a remote console comprising user interface controls in communication with said microprocessor via said wireless receiver.

2. The robot athlete of claim 1, wherein said one or more other supports comprises a support selected from the group comprising of rigid casters, swivel casters, spherical wheels, runners, and skids.

3. The robot athlete of claim 1, wherein said torso assembly further comprises:
    a torso body supported by said primary torso column, and wherein said torso lift subsystem comprises:
        the first motor connected to said primary torso column and operative to rotate a lift pinion that is engaged with a stationary rack that is connected to said chassis; and
        a spring assembly connected to said chassis and biased to assist said first motor in lifting said torso assembly.

4. The robot athlete of claim 1, wherein the vehicle subsystem propels the robot athlete in order to simulate human running or walking movement.

5. The robot athlete of claim 1, wherein the anthropomorphic body simulates twisting and jumping movements of a human athlete.

6. The robot athlete of claim 1, wherein the anthropomorphic body simulates twisting and jumping movements of a human athlete.

\* \* \* \* \*